US008025256B2

(12) United States Patent
Miller et al.

(10) Patent No.: US 8,025,256 B2
(45) Date of Patent: Sep. 27, 2011

(54) PRECISION ADJUST SPLIT DETENT FOR A VEHICLE

(75) Inventors: David George Miller, Mt. Laurel, NJ (US); Robert Paul Gradle, Mesa, AZ (US); James E. Taylor, Pennsauken, NJ (US)

(73) Assignee: The Boeing Company, Chicago, IL (US)

( * ) Notice: Subject to any disclaimer, the term of this patent is extended or adjusted under 35 U.S.C. 154(b) by 824 days.

(21) Appl. No.: 12/109,696

(22) Filed: Apr. 25, 2008

(65) Prior Publication Data

US 2009/0266940 A1    Oct. 29, 2009

(51) Int. Cl.
*B64C 13/00*    (2006.01)
*B64C 13/08*    (2006.01)
*B64C 13/46*    (2006.01)

(52) U.S. Cl. .............. 244/194; 244/223; 244/17.13

(58) Field of Classification Search .............. 244/194, 244/193, 178, 236, 230, 228, 227, 225, 224, 244/223, 17.13, 17.11; 318/628; 340/946, 340/965; 73/178 H
See application file for complete search history.

(56) References Cited

U.S. PATENT DOCUMENTS

| 5,853,152 | A | 12/1998 | Evans et al. |
| 6,679,458 | B2 | 1/2004 | Einthoven et al. |
| 7,930,074 | B2 * | 4/2011 | Cherepinsky et al. .......... 701/12 |
| 2005/0151672 | A1 | 7/2005 | Augustin et al. |

OTHER PUBLICATIONS

Miller et al., "HACT Flight Control System (HFCS) Control Law Overview", Presented at the American Helicopter Society 58th Annual Forum, Montreal, Canada Jun. 11-13, 2002, pp. 1-18.
Einthoven et al., "The HACT Vertical Controller", Presented at the American Helicopter Society 58th Annual Forum, Montreal, Canada Jun. 11-13, 2002, pp. 1-13.
EP partial search report for P106114EP00 dated Nov. 4, 2009.

* cited by examiner

*Primary Examiner* — Tien Dinh
*Assistant Examiner* — Richard R Green
(74) *Attorney, Agent, or Firm* — Yee & Associates, P.C.

(57) ABSTRACT

A method and apparatus for a split detent tactile cueing control system comprising an inceptor, a position sensor, vehicle sensors, and a flight control computer. The inceptor can be moved into different positions measured by a position sensor. The vehicle sensors generate signals in response to detecting parameters about a vehicle during a flight. The flight control computer is coupled to the inceptor and the vehicle sensors. The flight control computer is capable of generating actuation signals used to generate tactile cues to generate a flight path hold detent and an altitude hold detent within the plurality of positions using a force feel profile and the parameters. An extension of a latch force from the flight path hold detent to the altitude hold detent is present during changes in vehicle direction. Series actuator compensation allows increased split detent separation with insignificant command overshoot.

20 Claims, 19 Drawing Sheets

PRECISION ADJUST SPLIT DETENT FOR A VEHICLE

GOVERNMENT LICENSE RIGHTS

This invention was made with Government support under contract number DAAH10-00-C-0052 awarded by the United States Army Aviation & Missile Command. The Government has certain rights in this invention.

BACKGROUND INFORMATION

1. Field

The present disclosure relates generally to aircraft and in particular to a method and apparatus for controlling the flight of aircraft. Still more particularly, the present disclosure relates to a method and apparatus for controlling the flight of a helicopter with a precision adjust split detent.

2. Background

Inceptors are used to control various types of vehicles. For example, inceptors may be used to control helicopters and other types of aircraft. An inceptor may be moved or adjusted to maintain various desired vehicle states. These vehicle states include, for example, vertical velocity, airspeed, and other suitable states.

An inceptor may be part of an active control system emulating mechanical components, such as springs and friction clutches actuated by an electric motor or other actuation device. The actuation device may be controlled by a controller to provide tactile cues to the vehicle operator. A tactile cue may be, for example, an amount of force applied to the inceptor, or an amount of resistance to movement of the inceptor. The tactile cues may provide a perception of a force or counter force on the inceptor being manipulated by an operator.

As an example, with respect to the vertical velocity and the vertical position or altitude, an operator may adjust a vertical control inceptor to maintain a desired altitude or vertical velocity. Other inceptors, or the same inceptor, also may be used for other types of control, such as longitudinal, lateral, or directional control of the vehicle. In these examples, an inceptor used for vertical control of an aircraft also may be referred to as a collective control lever. By adjusting a collective control lever upward, a collective blade pitch may increase causing the vehicle to climb or ascend. By adjusting a collective control lever downward, the collective blade pitch may be decreased causing the vehicle to descend. The position of the collective control lever needed to maintain a constant velocity or altitude may be a function of various factors. The factors include, for example, vehicle velocity, acceleration, atmospheric conditions, and other factors.

Currently existing systems may provide for maintaining a vehicle in one of two states. These states include a constant vertical velocity or a constant altitude. The operator of the vehicle may command the vehicle control system to maintain one vehicle state or the other. Changes between these two states and commands within the states may be aided through the use of tactile cues.

SUMMARY

The advantageous embodiments provide a method and apparatus of a split detent for a vehicle. In one advantageous embodiment, a split detent tactile cueing control system comprises an inceptor, a position sensor, a set of vehicle sensors, and a flight control computer. The inceptor is capable of being moved into a plurality of positions. The position sensor is coupled to the inceptor, wherein the position sensor is capable of generating a position signal. The set of vehicle sensors is capable of generating a set of signals in response to detecting a set of parameters describing the state of the vehicle during a flight. The flight control computer is coupled to the inceptor and the set of vehicle sensors. The flight control computer is capable of generating a first set of actuation signals used to generate tactile cues to generate a flight path hold detent and an altitude hold detent within the plurality of positions using a force feel profile and the set of parameters, wherein an extension of a latch force from the flight path hold detent to the altitude hold detent is present during changes in direction of the vehicle.

In another advantageous embodiment, an apparatus comprises an inceptor and a flight control computer. The flight control computer generates a first detent profile and a second detent profile in response to a set of parameters detected during flight, wherein the first detent profile includes an extension toward the second detent profile.

In still another advantageous embodiment, a method provides tactile cues for an inceptor in a vehicle. A first detent profile and a second detent profile for a plurality of positions of the inceptor are generated. The first detent profile is extended towards the second detent profile, wherein changes in a position of the inceptor between a first detent in the first detent profile and a second detent in the second detent profile occur, wherein unintended repositioning of the inceptor is reduced.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
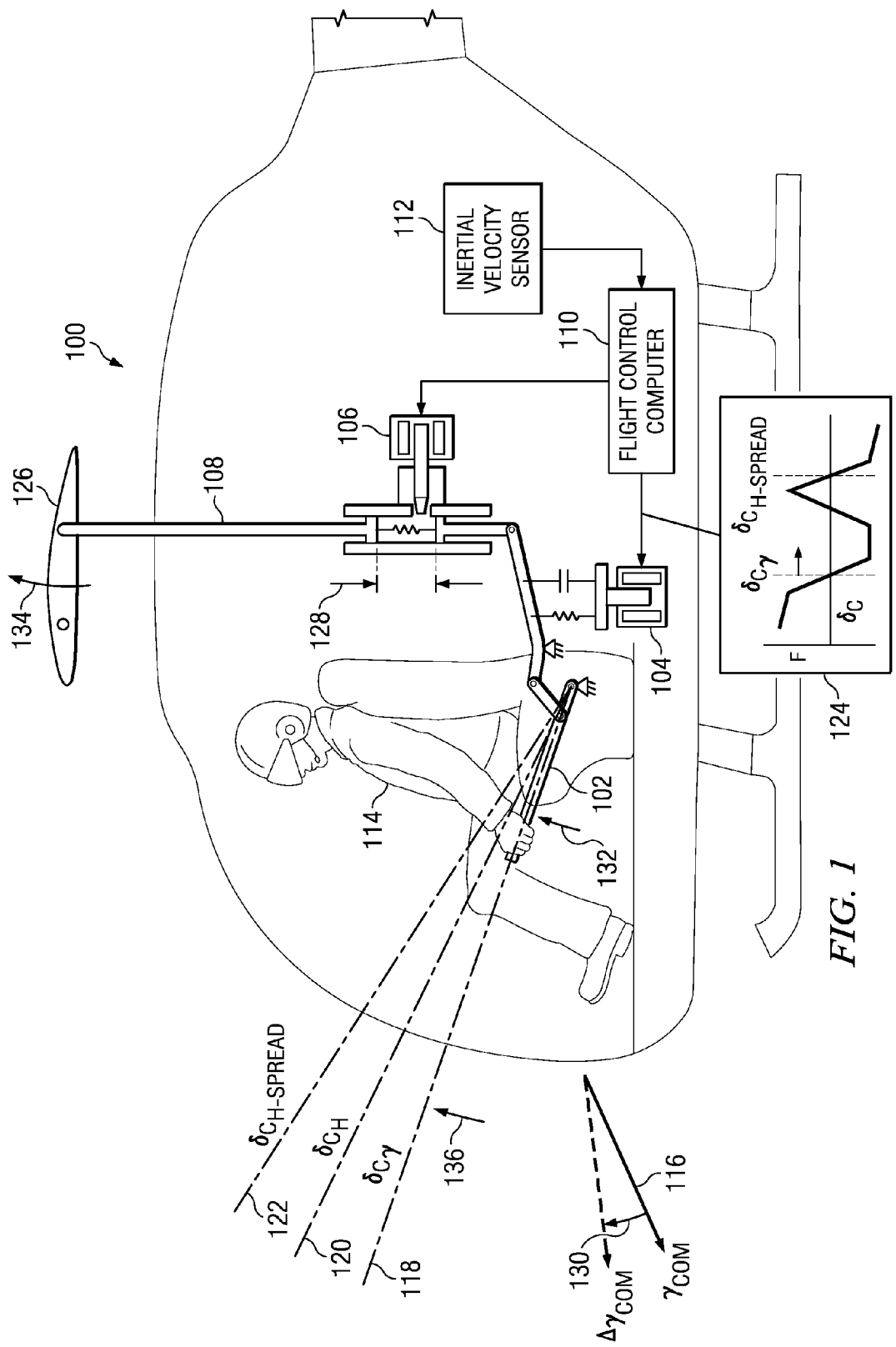
FIG. 1 is an illustration of a vehicle in which an advantageous embodiment may be implemented.

With reference now to the figures and in particular with reference to FIG. 1, an illustration of a vehicle is depicted in which advantageous embodiments may be implemented. In this example, helicopter 100 is an example of an aeronautical vehicle in which an advantageous embodiment may be implemented to control the flight of helicopter 100. In this example, helicopter 100 includes collective control lever 102, parallel actuator 104, series actuator 106, blade control system 108, flight control computer 110, and inertial velocity sensor 112. Pilot 114 may manipulate collective control lever 102 to control the vertical axis of helicopter 100.

In this illustrative example, helicopter 100 is in a flight condition in which helicopter 100 initially descends along a steady flight path as illustrated by arrow 116. Pilot 114 may maintain the path along arrow 116 by positioning collective control lever 102 at detent position 118 which is also referred to as $\delta_{C_\gamma}$.

In this example, collective control lever 102 may be moved to various other positions. These positions include, for example, without limitation, detent position 120 and detent position 122. Detent position 120 may also be referred to as $\delta_{C_H}$ and detent position 122 may also be referred to as $\delta_{C_H\ SPREAD}$. Detent position 118 may be used to maintain helicopter 100 in a constant velocity, while detent position 122 may be used to maintain helicopter 100 at a constant altitude. Only three positions for collective control lever 102 are illustrated in this example. Collective control lever 102 may be placed in many other positions other than the ones illustrated. The tactile cues provided by advantageous embodiments make it very easy for the pilot to position the collective control lever 102 in either the exact position required to hold altitude or the exact position required to hold a constant vertical velocity.

In this example, detent position 120 is the collective control lever 102 position that is required to hold the altitude of the helicopter 100 with neutral displacement 128 of the series actuator. The collective control lever 102 will eventually be positioned at detent position 120 for sustained constant altitude hold flight. Detent position 122 is the position of the altitude hold tactile cue that the pilot feels when the pilot initially commands a recapture of level flight from an initial condition of a commanded climb or descent. Detent position 122 is spread farther away from the flight path angle hold detent position 118 than detent position 120.

In other words, detent positions may change during flight with both detent position 122 and detent position 120 being used to maintain the altitude of an aircraft at different times. The particular detent position that is active to maintain the altitude may switch or vary depending on different parameters detected for helicopter 100. In these examples, the parameters may include a velocity of helicopter 100.

In these examples, parallel actuator 104 provides feedback to collective control lever 102 through signals generated by flight control computer 110. The tactile cues provided to pilot 114 provide this feedback. In the illustrative embodiments, these signals are generated using force feel profile 124. In this manner, parallel actuator 104 may provide feedback, such as positive and negative forces, on collective control lever 102. Force feel profile 124 provides pilot 114 an ability to position collective control lever 102 at detent position 118 and/or detent position 122 without having to apply stick force to hold collective control lever 102 in these positions.

Detent position 118 and detent position 122 are also referred to as force detent positions. Force detent positions are positions in which no feedback or force by pilot 114 is needed to maintain these positions for collective control lever 102. In other words, these detent positions allow pilot 114 to hold a flight path angle, climbing or descending. This type of control is a control of the vertical velocity. In these examples, in detent position 118, a constant vertical velocity state is present. In detent position 122, a constant altitude state is present that may allow pilot 114 to hold a constant altitude.

In either case, pilot 114 does not need to apply force to collective control lever 102 to maintain these positions. The presence of detent position 118, detent position 122, and tactile cues that they may provide makes it easier for pilot 114 to transition from one flight state to another flight state. These types of transitions may be performed without any reference to flight instrumentation or view of outside cues.

Further, force feel profile 124 may be processed by flight control computer 110 to generate signals that are sent to parallel actuator 104 to provide tactile cues to pilot 114. These cues may provide a force and/or lack of force in response to a force applied by pilot 114 to collective control lever 102. These tactile cues may be provided when pilot 114 moves collective control lever 102 through detent position 118 and/or detent position 122 in a manner that allows pilot 114 to position collective control lever 102 to a position that is relatively close to one of these detent positions.

For example, once collective control lever 102 is positioned near detent position 118 or detent position 122, flight control computer 110, using force feel profile 124, may cause collective control lever 102 to move towards one of these detent positions. The detent position selected is the one that collective control lever 102 is closest to in this example. This type of movement occurs when pilot 114 relaxes or reduces force applied to collective control lever 102. Force feel profile 124 also may be used to "backdrive" collective control lever 102 automatically when detent position 118 or detent position 122 are varied by flight control computer 110. These detent positions may be varied based on sensed velocities detected by inertial velocity sensor 112. These changes are generated to hold a commanded flight path angle, such as that indicated by arrow 116.

In these examples, series actuator 106 may adjust blade control system 108 to change the collective blade pitch angle for blades 126. Series actuator 106 is capable of adjusting the blade pitch angle for blades 126 independently of the position of collective control lever 102. Series actuator 106 is shown in a neutral displacement state as indicated by displacement 128. Series actuator 106 may extend or retract in response to commands from flight control computer 110 to change displacement 128. In response, the angle of blades 126 may be changed.

When pilot 114 changes the position of collective control lever 102, this change may decrease or increase the rotor collective blade pitch angle for blades 126 using blade control system 108.

A change in the position of collective control lever 102 causes a change in the rotor collective pitch blade angle for blades 126. Blade control system 108 may change the pitch upwards or downwards from the illustrated neutral position for blades 126.

The different advantageous embodiments allow pilot 114 to make fine adjustments to reduce a commanded flight path angle by a smaller amount than presently allowed with currently existing systems. These adjustments may be commands to change the flight path angle in the range of approximately 1.5 to approximately 4.5 degrees. This type of adjustment is important because small adjustments in flight path angle are necessary for precision landing approaches. In this example, the flight path adjustment may be, for example, the amount between arrow 116 and arrow 130.

For example, pilot 114 may reduce the magnitude of the currently commended angle of descent indicated by arrow 116 by applying an upward force to collective control lever 102 to move collective control lever 102 slightly upward in the direction of arrow 132. This upward motion may act to increase the collective blade pitch angle of blades 126 in the direction shown by arrow 134.

Force feel profile 124 allows pilot 114 to move collective control lever 102 upward from detent position 118 without experiencing the unpredictable stick force jump that occurs with current split detent force feel profile systems. In these examples, momentarily applying upward force to collective control lever 102 has an effect of moving detent position 118 to an increased upward position as indicated by arrow 136.

The different advantageous embodiments may set detent position 122 with a tactile cue that is somewhat above detent position 120 to maintain level flight with neutral actuator displacement 128. The different advantageous embodiments may provide a detent spread augmentation feature that increases the separation or distance between detent position 118 and detent position 122 in a manner that avoids potential interference between these two positions. In these examples, an extension and/or retraction of series actuator 106 is used to compensate for the artificial spread of detent position 118 and detent position 122 when pilot 114 pulls collective control lever 102 to detent position 122 when capturing level flight from an initial commanded descent position.

Figure 2:
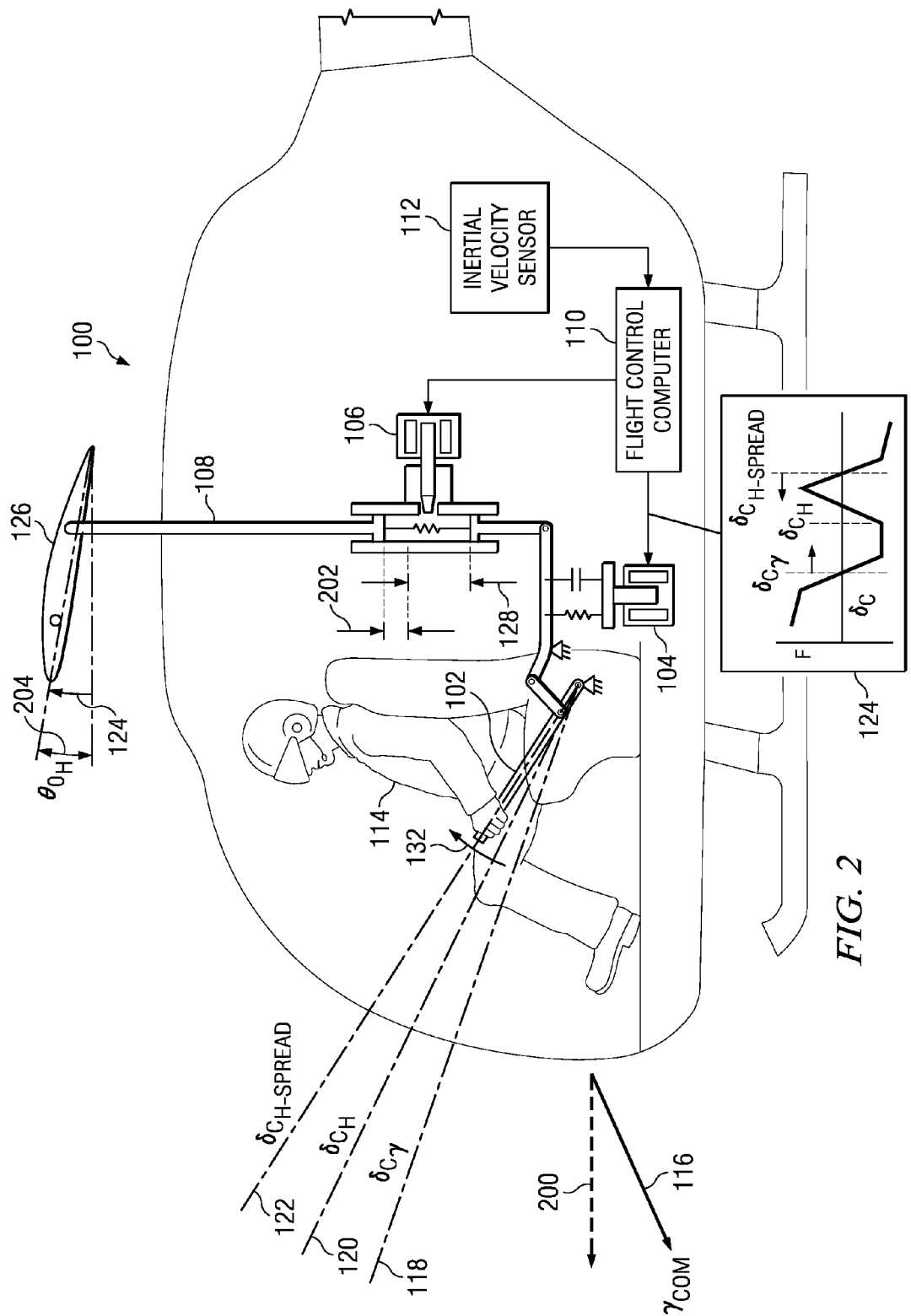
FIG. 2 is a diagram illustrating level fight capture from an initial descending flight path angle in accordance with an advantageous embodiment.

With reference now to FIG. 2, a diagram illustrating level fight capture from an initial descending flight path angle is depicted in accordance with an advantageous embodiment. In this example, pilot 114 may capture a level flight path angle as indicated by arrow 200 from the initial descending flight path angle as indicated by arrow 116. This change in flight path angle may be caused by moving collective control lever 102 from detent position 118 to detent position 122. This movement occurs until the pilot feels the tactile cue for detent position 122. The tactile cue for detent position 122 makes it very easy for the pilot to stop moving the collective control lever 102 when collective control lever 102 reaches detent position 122. Detent position 122 may be spread out to avoid interference with detent position 118.

Pilot 114 may encounter forces exerted on collective control lever 102 by parallel actuator 104 as collective control lever 102 is moved along the direction of arrow 132. This force is counter to the force of arrow 132 in these examples. At around detent position 122, pilot 114 may reduce or relax the force applied to collective control lever 102 and allow flight control computer 110 to automatically capture and hold the altitude of helicopter 100.

In these examples, force feel profile 124 may change various tactile cues, detent position 118, and detent position 122. These changes may be based on a set of parameters detected for helicopter 100 during flight. In the different examples, "a set" refers to one or more items. For example, a set of parameters is one or more parameters. An example of a parameter may be, for example, without limitation, velocities detected by inertial velocity sensor 112 in these examples.

After pilot 114 moves collective control lever 102 to detent position 122, detent position 118 may move towards detent position 120, based on force feel profile 124. Detent position 120 is a steady state position that is required to maintain level flight with neutral displacement of series actuator 106.

During the time when detent position 122 moves toward detent position 120, flight control computer 110 may send signals to series actuator 106 to command an extension of series actuator 106 beyond its neutral displacement as indicated by neutral actuator displacement 128. This extension is shown as displacement 202. Displacement 202 compensates for the fact that collective control lever 102 may be momentarily positioned above detent position 120, which is the position required for level flight. This change positions the rotor collective blade pitch for blades 126 at angle 204, which is the angle required to achieve level flight.

Figure 3:
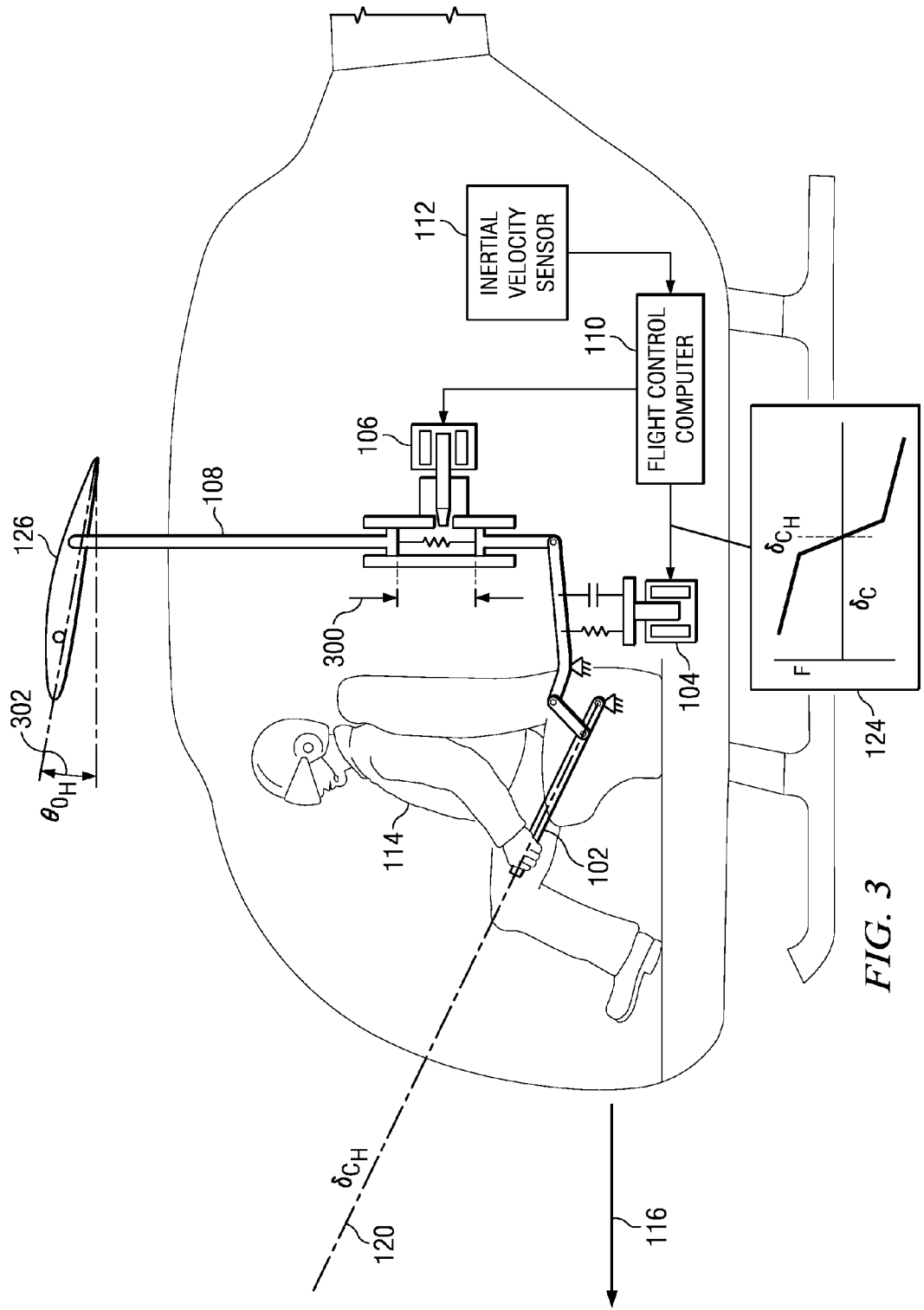
FIG. 3 is a diagram illustrating a helicopter in sustained level flight in accordance with an advantageous embodiment.

With reference now to FIG. 3, a diagram illustrating a helicopter in sustained constant altitude flight is depicted in accordance with an advantageous embodiment. In this example, pilot 114 may relax force on collective control lever 102 and collective control lever 102 may be automatically pushed or backdriven to remain at detent position 120. In these examples, the term "backdriven" means to push downward or upward. In these examples, collective control lever 102 is backdriven as a result of forces exerted on series actuator 106.

Force feel profile 124 provides a single detent at detent position 120 for a steady state position that is used to maintain level flight with neutral displacement of series actuator 106. This neutral displacement is shown as displacement 300. In these examples, the actual position for detent position 120 is identified or calculated by flight control computer 110 using vertical velocity inputs detected by inertial velocity sensor 112.

In these examples, the rotor collective blade pitch angle of blades 126 is positioned at angle 302 to maintain level flight. Angle 302 is generated because parallel actuator 104 backdrives or forces collective control lever 102 to detent position 120. In these examples, series actuator 106 is positioned at displacement 300 in steady state flight conditions to provide pilot 114 with situational awareness of the angle for blades 126 through the position of collective control lever 102.

Figure 4:
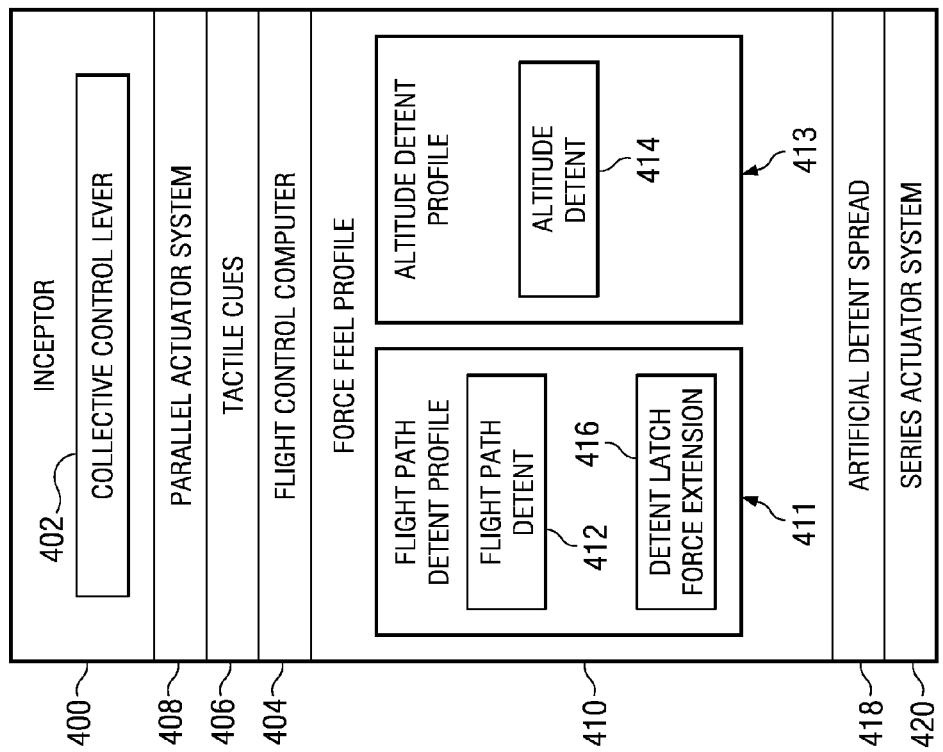
FIG. 4 is a block diagram of a precision adjust split detent apparatus in accordance with an advantageous embodiment.

With reference now to FIG. 4, a block diagram of a precision adjust split detent apparatus is depicted in accordance with an advantageous embodiment. In this example a pilot may operate inceptor 400 to control the flight of the vehicle. In this example inceptor 400 may take the form of collective control lever 402. Collective control lever 402 may be a collective control lever, such as collective control lever 102 used in helicopter 100 in FIG. 1. Collective control lever 402 may be moved upwards and downwards in a number of different positions. In this example, flight control computer 404 may generate tactile cues 406 that may be sensed by a pilot using collective control lever 402. Tactile cues 406 may be sent to collective control lever 402 through parallel actuator system 408. In these examples, parallel actuator system 408 may be, for example, a parallel actuator similar to parallel actuator 104 in FIG. 1. Flight control computer 404 may be implemented using data processing system 500 in FIG. 5 below.

In these examples, tactile cues 406 may include a first detent and a second detent. In these examples, a detent is a position for collective control lever 402 in which no force is needed by the operator to maintain collective control lever 402 in that position. Additionally, tactile cues 406 may push collective control lever 402 towards a detent position when the operator moves collective control lever 402 away from the detent position.

These detents may be generated using force feel profile 410. In these examples, the first detent may be flight path detent 412, while the second detent may be altitude detent 414. Flight path detent 412 may be used to hold a flight path angle, while altitude detent 414 may be used to hold the altitude of an aircraft. Flight path detent 412 may be used to initiate or maintain the vehicle in a constant velocity state, while altitude detent 414 may be used in or used to initiate a constant altitude state of operation for the aircraft.

Flight path detent 412 is part of flight path detent profile 411, and altitude detent 414 is part of altitude hold detent profile 413. These profiles include characteristics for tactile cues that may be associated with respective detents. These characteristics for tactile cues may include ones that may be used to maintain or push collective control lever 402 towards an associated detent when the collective control lever is within some distance or range of positions of the detent.

In the different advantageous embodiments, flight path detent 412 and altitude detent 414 may be located along two different positions within the different positions of collective control lever 402. Also, these detents may move during operation of the aircraft, depending on various parameters detected for the aircraft during flight.

Also, flight path detent profile 411 includes detent latch force extension 416. This component is an extension of flight path detent 412 towards altitude detent 414. Detent latch force extension 416 makes it possible for a pilot or other operator of collective control lever 402 to move collective control lever 402 away from flight path detent 412 towards altitude detent 414 in a manner that requires the operator to exert force to move collective control lever 402, but avoid unintended movements of collective control lever 402 from other factors. An unintended movement is any movement of collective control lever 402 that is not desired by the operator.

These factors include, for example, without limitation, aircraft vibration, friction in the cockpit control inceptor, or other factors that may cause unintended movement of collective control lever 402. The different advantageous embodiments recognize that with currently used systems, such an extension is absent and a gap is present between the two detent profiles. As a result, the different advantageous embodiments recognize that unintended movement of collective control lever 402 may result in unintended changes in the velocity of the aircraft.

These unintended movements may result from a sudden absence of tactile cues at low vertical speeds. In other words, a tactile cue may be present to push collective control lever 402 back towards flight path detent 412. If the operator pushes collective control lever 402 upwards and the position of collective control lever 402 leaves flight path detent profile 411, a sudden absence of force may be present. As a result, collective control lever 402 may jump or move farther than desired because of the sudden change in resistance. This is a problem that the different advantageous embodiments recognize as being present with currently available systems having split or dual detents for collective control lever 402.

Further, during various maneuvers, flight control computer 404 may move flight path detent 412 and altitude detent 414 towards each other. This movement of these detents may result in an overlap between flight path detent profile 411 and altitude hold detent profile 413. The different advantageous embodiments recognize this overlap may result in undesirable force feel characteristics, as well as possibly unpredictable flight path hold characteristics.

As a result, the different advantageous embodiments also include artificial detent spread 418, which may spread out flight path detent 412 and altitude detent 414 in a manner such that flight path detent profile 411 and altitude hold detent profile 413 do not overlap, or overlap in a manner in which undesirable characteristics are avoided. In these examples, artificial detent spread 418 may be generated by flight control computer 404 through signals sent to parallel actuator system 408. Artificial detent spread 418 may be compensated for through signals sent to the series actuator system 420. In these examples, this actuator system may be, for example, series actuator 106 in FIG. 1. Actuator system 420 may increase the displacement needed to change the angle of blades.

Thus, the different advantageous embodiments provide a detent force extension feel characteristic along with adjusting the altitude hold detent position during commanded climbs and descents to artificially increase the spread or distance between the altitude hold detent and the flight path detent and match positions in the profiles to form a detent spread augmentation. Further, series actuator commands or signals may be generated to compensate for the artificially spread position of the altitude hold detent position so that level flight may be captured without any rate of climb overshoots or undershoots. This type of artificial detent spread also may be referred to as detent spread augmentation.

Figure 5:
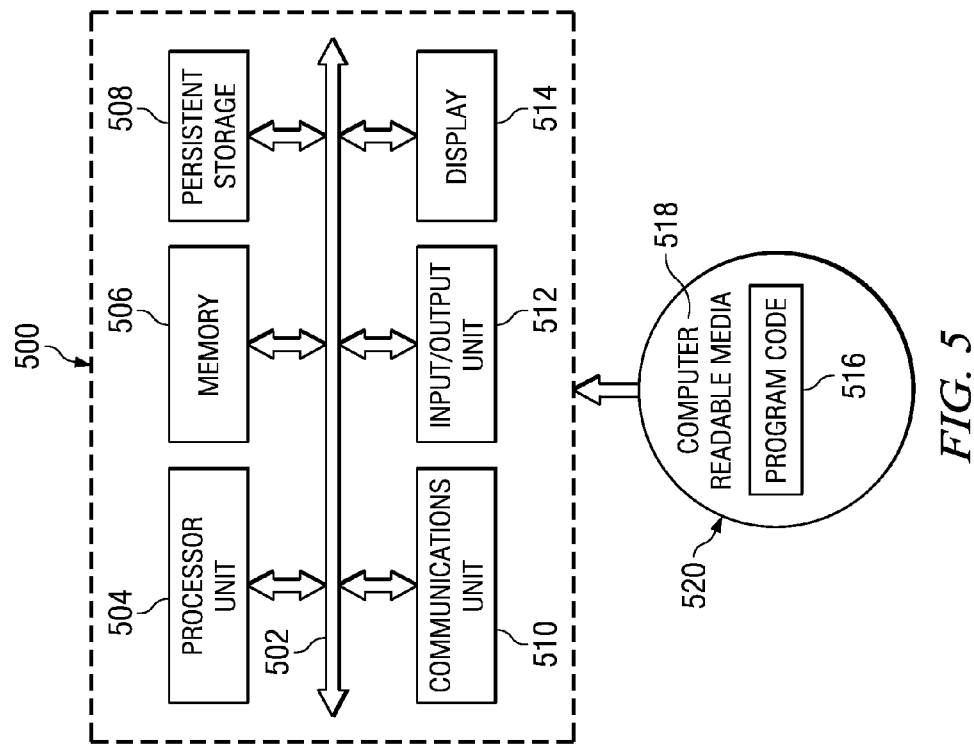
FIG. 5 is a diagram of a data processing system in accordance with an advantageous embodiment.

Turning now to FIG. 5, a diagram of a data processing system is depicted in accordance with an advantageous embodiment. In this illustrative example, data processing system 500 includes communications fabric 502, which provides communications between processor unit 504, memory 506, persistent storage 508, communications unit 510, input/output (I/O) unit 512, and display 514. In these examples, data processing system 500 may be used to implement flight control computer 110 in FIG. 1.

Processor unit 504 serves to execute instructions for software that may be loaded into memory 506. Processor unit 504 may be a set of one or more processors or may be a multiprocessor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices. A storage device is any piece of hardware that is capable of storing information either on a temporary basis and/or a permanent basis. Memory 506, in these examples, may be, for example, a random access memory or any other suitable volatile or non-volatile storage device. Persistent storage 508 may take various forms depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard and mouse. In these examples, input/output unit 512 may be used to generate signals to control various devices, such as parallel actuator 104 and series actuator 106 in FIG. 1. Further, input/output unit 512 may be used to receive data from various sensors used to sense parameters about a vehicle during flight. In these examples, the parameters may be received from a component or sensors such as inertial velocity sensor 112 in FIG. 1. Further, input/output unit 512 may send output to a printer. Display 514 provides a mechanism to display information to a user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 516 is located in a functional form on computer readable media 518 that is selectively removable and may be loaded onto or transferred to data processing system 500 for execution by processor unit 504. Program code 516 and computer readable media 518 form computer program product 520 in these examples. In one example, computer readable media 518 may be in a tangible form, such as, for example, an optical or magnetic disc that is inserted or placed into a drive or other device that is part of persistent storage 508 for transfer onto a storage device, such as a hard drive that is part of persistent storage 508. In a tangible form, computer readable media 518 also may take the form of a persistent storage, such as a hard drive, a thumb drive, or a flash memory that is connected to data processing system 500. The tangible form of computer readable media 518 is also referred to as computer recordable storage media. In some instances, computer readable media 518 may not be removable.

Alternatively, program code 516 may be transferred to data processing system 500 from computer readable media 518 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

As one example, a storage device in data processing system 500 is any hardware apparatus that may store data. Memory 506, persistent storage 508 and computer readable media 518 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506 or a cache such as found in an interface and memory controller hub that may be present in communications fabric 502.

Figure 6:
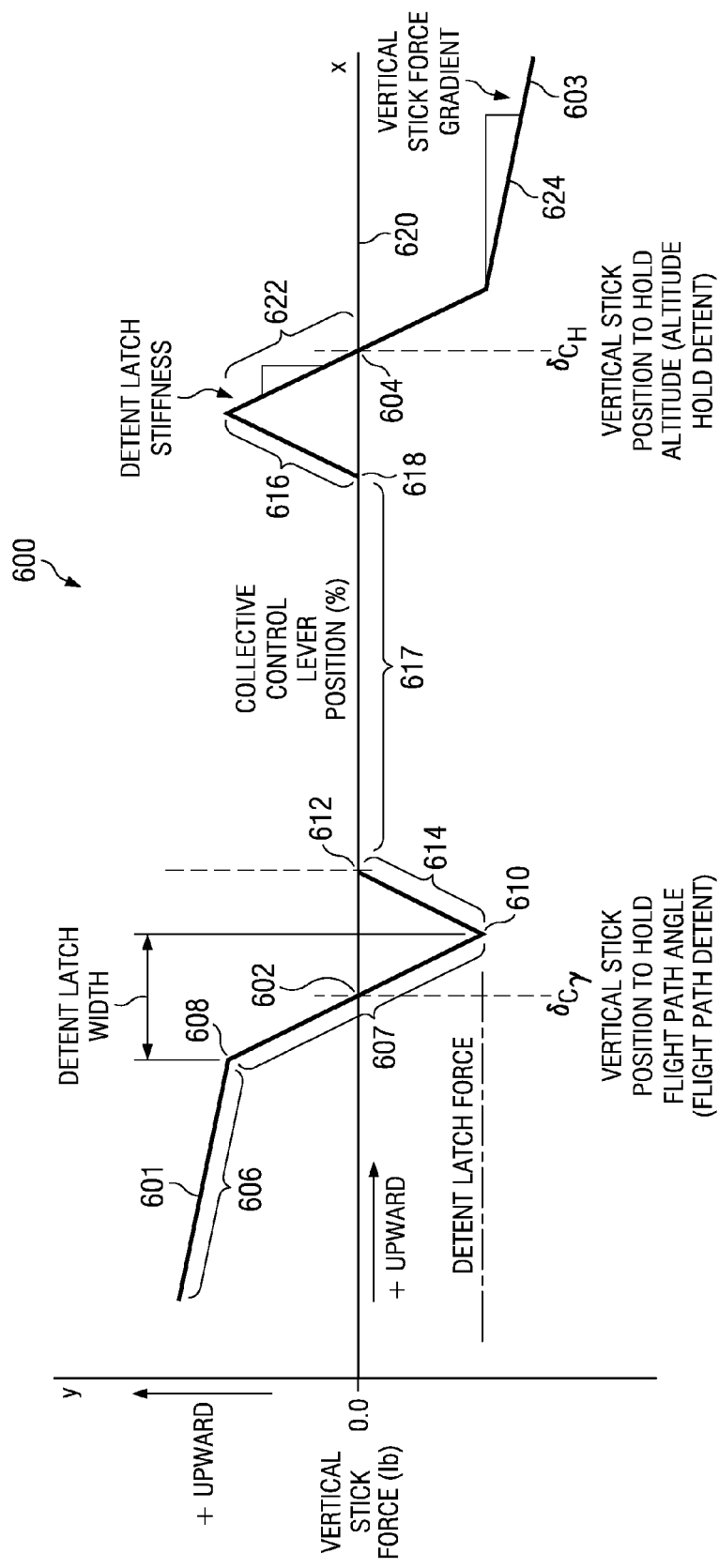
FIG. 6 is a diagram illustrating a known force feel profile.

With reference now to FIG. 6, a diagram illustrating a known force feel profile is depicted. In this example, force feel profile 600 is an example of a currently used force feel profile to provide detents and feedback for a collective control lever. The different advantageous embodiments recognize that this type of profile has a number of drawbacks when changes in commanded flight path angle are attempted at different levels of precision. In this example, force feel profile 600 illustrates vertical stick force exerted by an active force feel actuator on a collective control lever on the Y axis. The X axis illustrates collective control lever positions. In these examples, the force that may be exerted on the collective control lever is generated by a component, such as parallel actuator 104 in FIG. 1.

In these examples, force feel profile 600 provides a flight path detent at point 602 and an altitude hold detent at point 604. In these examples, line 601 represents a flight path detent profile, such as flight path detent profile 411 in FIG. 4; while line 603 represents an altitude hold detent profile, such as altitude hold detent profile 413 in FIG. 4 within force feel profile 600. Point 602 may correspond to detent position 118 in FIG. 1, while point 604 may correspond to detent position 122 in FIG. 1. As can be seen, force feel profile 600 is a split detent force feel profile with a flight path hold detent and an altitude hold detent.

In these examples, stick force gradient 606 decreases in upward force as a collective control lever is moved upwards towards point 602. This force tends to move the collective control lever towards the flight path detent at point 602. This gradient provides a tactile feel or feedback for collective control lever points that are lower than point 608. Stick force gradient 606 is considered to be stable, in these examples, because a pilot is required to increase downward force on the collective control lever to displace this lever in a downward position.

As a result, if force is relaxed or reduced on the collective control lever by the pilot when this lever is within stick force gradient 607, the collective control lever moves upward and eventually moves to an equilibrium point at a zero force point at point 602.

Between point 608 and point 610 stick force gradient 614 is present. This gradient is intended to hold the collective control lever in a position within a close tolerance of the flight path detent at point 602. This profile may hold the collective control lever position even in the presence of gravity, friction, and/or inadvertent pilot stick force being applied to the collective control lever.

When the collective control lever is positioned between point 610 and point 612, stick force gradient 614 pushes the collective control lever upward until the collective control lever reaches zero stick force at point 612. The different advantageous embodiments recognize that stick force gradient 614 may cause the collective control lever to jump or move unpredictably by a small amount when a pilot attempts to reduce the commanded flight path angle by positioning the collective control lever slightly outside the width of the flight path hold detent just to the right of point 610.

The different advantageous embodiments recognize that force feel profile 600 does not allow a pilot to make reductions in the commanded flight path angle in as fine and precise a manner as desired. The different advantageous embodiments recognize that this type of inability is a significant shortcoming of force feel profile 600. In these examples, force feel deadzone 617 occurs in the range of positions between points 612 and 618 in which no tactile cues are provided.

In this example, detent stiffness region 616 begins at point 618 until point 620. At point 620, stable detent stiffness region 622 is present. After point 604, force is applied downward along vertical stick force gradient 624.

Figure 7:
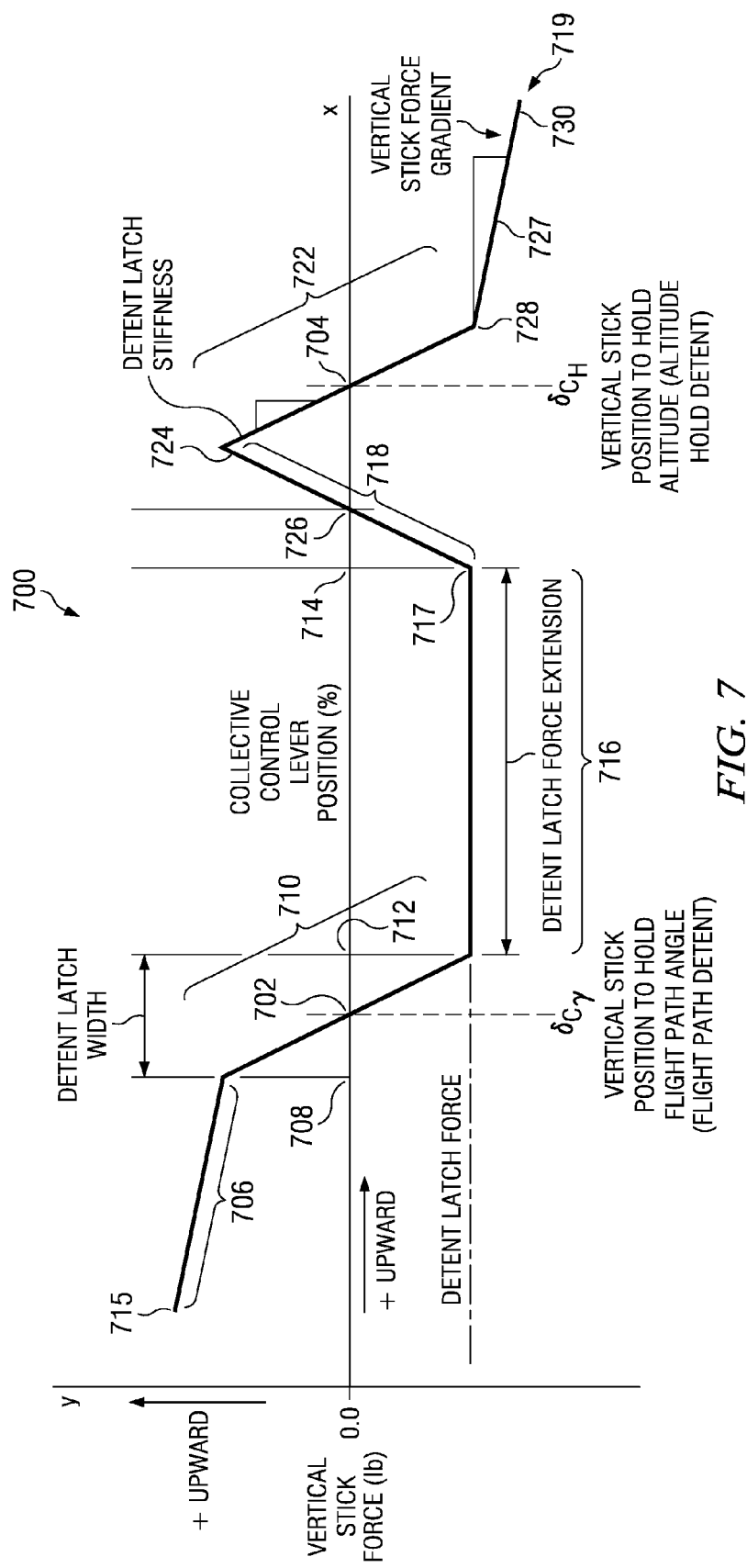
FIG. 7 is an illustration of a force feel profile in accordance with an advantageous embodiment.

With reference now to FIG. 7, an illustration of a force feel profile is depicted in accordance with an advantageous embodiment. In this example, force feel profile 700 is an example of a split detent force feel profile that may be used during descent of an aircraft. In this example, the stick force is represented on the Y axis while the collective lever position is represented on the X axis.

Force feel profile 700 is an example of a force feel profile that may be implemented in flight control computer 110 in FIG. 1 to provide detents, such as detent positions 118 and 122 in FIG. 1. Further, force feel profile 700 is an example of force feel profile 124 in FIG. 1. The different forces applied based on force feel profile 700 may be implemented by control signals sent to an actuator, such as parallel actuator 104 in FIG. 1.

As illustrated, force feel profile 700 provides detent positions at points 702 and 704. Point 702 is a flight path detent, which may be used to hold a flight path angle. Point 702 corresponds to detent position 118 in FIG. 1, in these examples. Point 704 is an altitude hold detent that may be used to hold altitude in these examples. Point 704 represents a position that corresponds to detent position 122 in FIG. 1.

In this example, detent gradient 706 is present up to point 708. Detent gradient 706 pushes the collective control lever upward for collective control lever positions that are lower than point 708. This particular force gradient is considered stable, in these examples, because a pilot needs to increase the downward force on the collective control lever to displace the collective control lever further downward.

As a result, if a pilot relaxes or decreases the downward force when the collective control lever is positioned within detent gradient 706, the collective control lever begins to move upward and eventually comes to equilibrium at point 702. As the collective control lever moves upwards, after point 708, steeper stable control gradient 710 is present. This gradient tends to push the collective control lever towards point 702 while the collective control lever is between point 708 and point 712.

The distance between point 708 and point 712 is referred to as a detent latch width. The gradient present within this width is intended to hold the collective control lever position within a close tolerance of the flight path detent position identified by point 702 in these examples. This force is desired to hold the collective control lever close to point 702 even in the presence of gravity, friction, and/or an inadvertent application of force by the pilot to the collective control lever.

The different advantageous embodiments provide an ability to prevent an unstable stick force gradient between points 712 and 714. The different advantageous embodiments provide detent latch force extension 716 between points 712 and 714. This region provides a constant level of restoring stick force when the collective control lever is positioned outside of the detent latch identified by points 708 and 712. This constant restoring force pushes the collective control lever towards point 702.

Detent latch force extension 716 is implemented as a constant restoring force, in this example, to eliminate unpredictable collective control lever jumps that may occur with prior art force feel profiles. Further, detent latch force extension 716 allows a pilot to make fine and precise adjustments to reduce the commanded flight path angle. Thus, in these illustrative examples, the flight path detent profile within force feel profile 700 begins at point 715 and ends at point 717.

Additionally, force feel profile 700 includes an altitude hold detent as indicated at point 704. This detent is part of an altitude detent profile that begins at point 717 and ends at point 719 in these examples.

Unstable detent latch stiffness region 718 is present between point 717 and point 724. Stable detent latch stiffness region 722 is present between point 724 and point 728. Vertical stick force gradient 727 is present between point 728 and point 730. The magnitude of the stick force at point 712 is referred to as a detent latch force.

The altitude hold detent force feel profile, in these advantageous embodiments, provides identical altitude hold and tactile cueing performance as in prior force feel profiles. The different advantageous embodiments, however, avoid force gradient instability when the collective control lever is positioned just outside (to the right of point 712 in FIG. 7) of the detent latch width region between point 708 and point 712 and therefore allow the pilot to make small corrections to the flight path of the vehicle.

Further, the different advantageous embodiments may move the flight path detent and the altitude hold detent relative to each other, depending on information detected by an inertial velocity sensor. The movement of the detents in the profiles associated with these detents may cause an overlap between the two detent profiles within force feel profile 700. This overlap may result in unintended tactile cues and/or unintended changes in a state of the aircraft.

Figure 8:
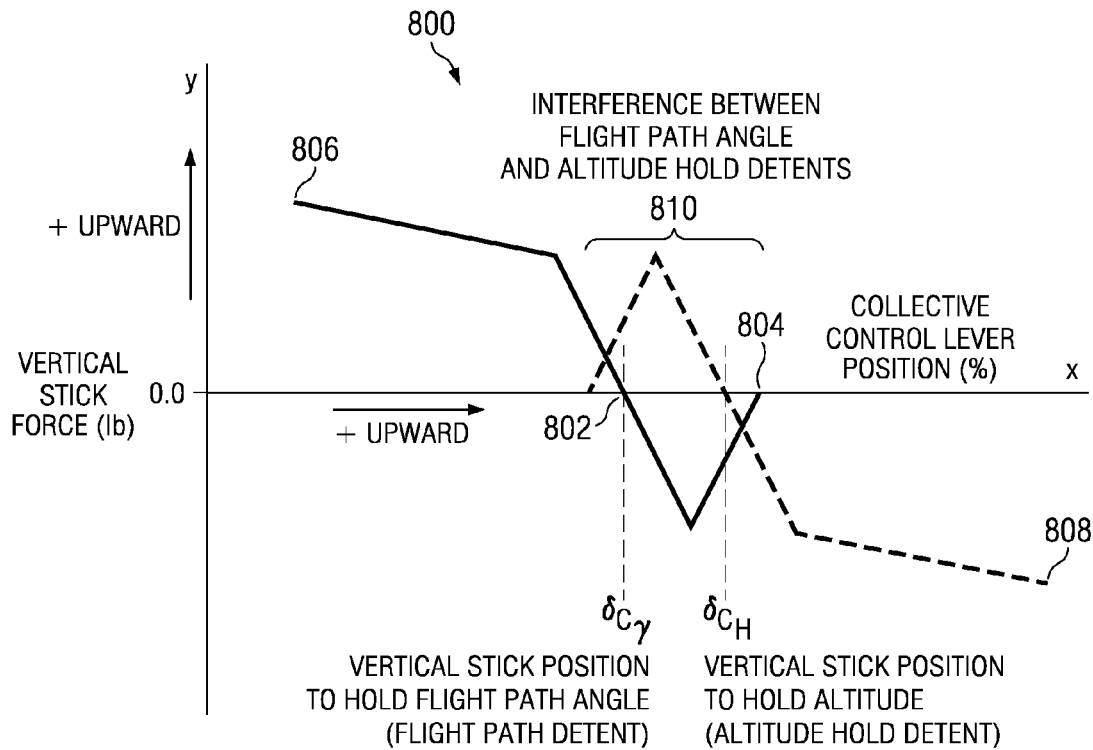
FIG. 8 is an illustration of inadequate separation between altitude hold and flight path angle detents that occurs with currently used systems.

With reference now to FIG. 8, an illustration of inadequate separation between altitude hold and flight path angle detents provided by an advantageous embodiment of prior art is depicted. In this example, force feel profile 800 illustrates the presence of an inadequate separation between an altitude hold detent and a flight path detent that may occur in shallow descent at low airspeeds that different advantageous embodiments prevents and/or minimize.

This illustration is an example of a problem recognized by the different advantageous embodiments with respect to currently used split detent force feel profiles. This problem may occur, in some cases, with the use of the detent latch force extension in the different advantageous embodiments. In this example, the flight path detent is illustrated at point 802, while the altitude hold detent is illustrated at point 804. The different gradients for the flight path detent are illustrated in line 806, while the different gradients for the altitude hold detent are illustrated in line 808.

The different advantageous embodiments recognize that this type of situation may occur with currently used split detent force feel profiles when the flight path hold detent position and the altitude hold detent position are in close proximity to each other. This type of proximity may occur using presently available systems when small flight path angles are commanded at low forward flight speeds.

The different embodiments recognize that this type of close proximity may result in a problem in which interference between the flight path hold detent force feel characteristic for the detent profile represented by line 806 and the altitude hold detent force feel characteristic for the detent profile presented by line 808 in section 810 may occur. These two detent profiles are part of force feel profile 800.

In this section, the force feel characteristics for the two detent profiles overlap and cause interference. The interference between the force feel characteristics of these two detents may result in unpredictable flight path hold performance. Further, a tendency for uncommanded transition from flight path hold state to altitude hold state may also occur. In these examples, uncommanded means that the change occurs without an input or command being input by the operator. In other words, the state may change without the operator moving the collective control lever. The different advantageous embodiments recognize that this type of situation is a problem and may occur in the currently implemented force feel profile systems.

As a result of recognizing these problems and other problems, the different advantageous embodiments provide a detent spread augmentation to prevent and/or minimize this type of overlapping.

Figure 9:
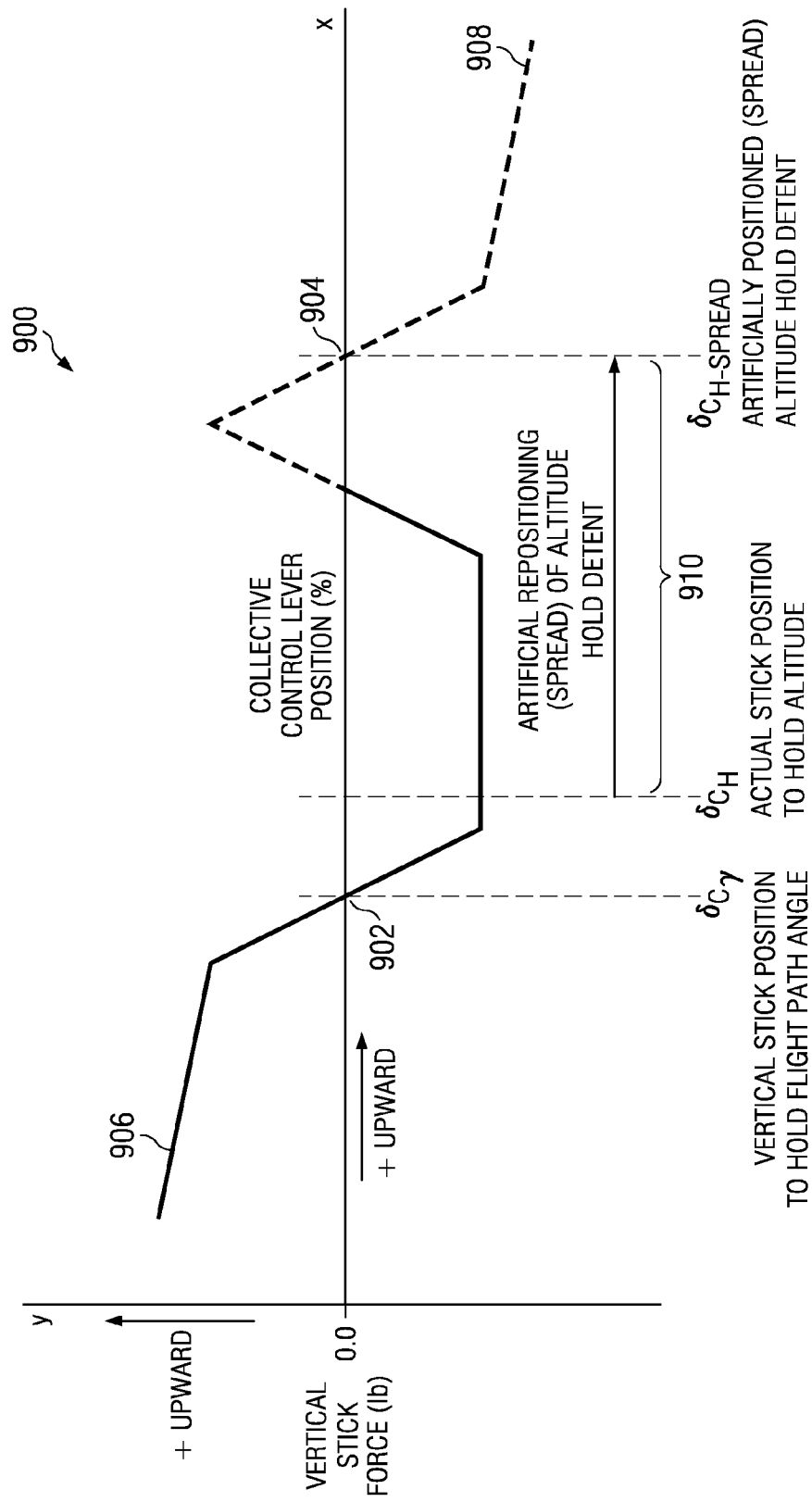
FIG. 9 is a diagram illustrating a force feel profile in which adequate separation is provided between the altitude hold and flight path angle hold detents in accordance with an advantageous embodiment.

With reference now to FIG. 9, a diagram illustrating a force feel profile in which adequate separation between detents is depicted in accordance with an advantageous embodiment. In this example, force feel profile 900 illustrates vertical stick force on the Y axis and collective control lever position on the X axis. In this example, force feel profile 900 is an example of a force feel profile that may be implemented as force feel profile 124 in FIG. 1 for use by flight control computer 110 in FIG. 1.

In this example, the flight path hold detent position is shown at point 902 and the altitude hold detent position is shown in point 904. Line 906 illustrates the force feel characteristics for the flight path detent, while line 908 illustrates the force feel characteristics for the altitude hold detent. In the advantageous embodiments, the flight path detent represented by point 902 and the altitude hold detent represented by point 904 would normally be in close proximity when small flight path angles are commanded at low flight speeds.

The different advantageous embodiments increase the separation between point 902 and point 904 as shown with section 910. This separation may be included in climbing or descending flight path angles or may be commanded to avoid interference between the force feel characteristics in line 906 and the force feel characteristics in line 908.

The increased separation provided by section 910 between the detents may be provided through repositioning of the altitude hold detent cue. Section 910, in which artificial repositioning of the spread of the altitude hold detent may occur, is also referred to as detent spread augmentation. In this manner, a tendency for uncommanded transitions between flight path hold mode to altitude hold mode may be reduced or eliminated. This type of modification of the characteristics may be especially useful at shallow flight path angles.

Figure 10:
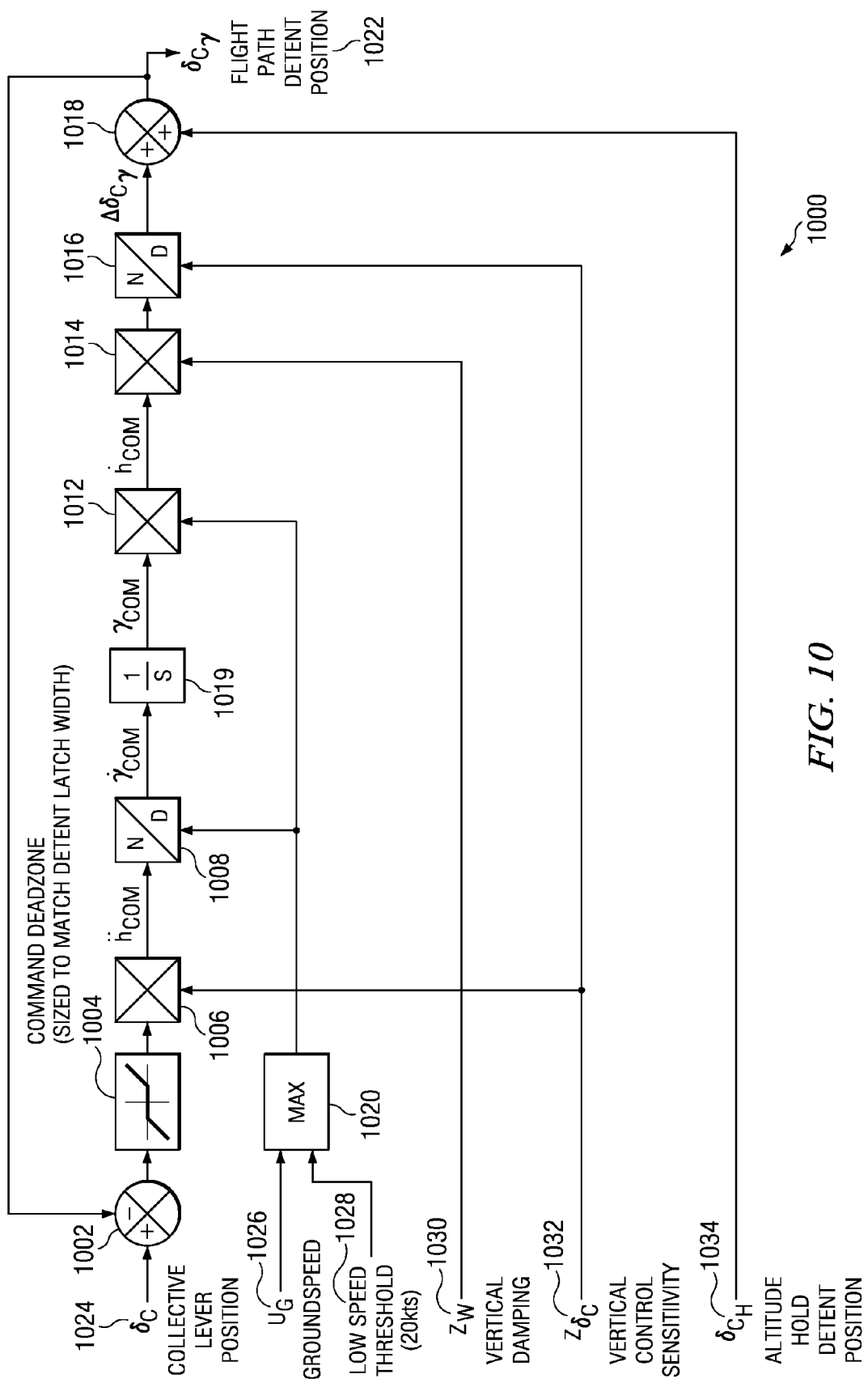
FIG. 10 is an illustration of a logic diagram for calculating a flight path detent position in accordance with an advantageous embodiment.

With reference now to FIG. 10, an illustration of a logic diagram for calculating a flight path detent position is depicted in accordance with an advantageous embodiment. In this example, logic 1000 is an example of functional and/or logical blocks which may be implemented in software and/or hardware. These components may be implemented in a data processing system, such as data processing system 500 in FIG. 5. In this example, logic 1000 includes subtractor 1002, command deadzone 1004, multiplier 1006, divider 1008, integrator 1019, multiplier 1012, multiplier 1014, divider 1016, summing node 1018, and maximum value operator 1020.

In operation, logic 1000 generates flight path detent position 1022, $\delta_{C_V}$. Logic 1000 receives inputs that include collective lever position $\delta_C$ 1024, ground speed $U_G$ 1026, low speed threshold 1028, vertical damping $Z_W$ 1030, vertical control sensitivity $Z_{\delta_C}$ 1032, and altitude hold detent position $\delta_{C_H}$ 1034.

In these examples, ground speed 1026 may be detected using an inertial velocity sensor, such as inertial velocity sensor 112 in FIG. 1. Vertical damping 1030 and vertical control sensitivity 1032 may be estimated ahead of time for a given aircraft and may be identified as functions of airspeed. Altitude hold detent position 1034 may be calculated based on the sensed velocity, vertical damping 1030, and vertical control sensitivity 1032. The difference between collective lever position 1024 and the current value for flight path detent position 1022 is calculated using subtractor 1002. The result is a time rate of change of vertical velocity that is sent to command deadzone 1004.

Command deadzone 1004 prevents commands from small deflections of the collective lever that may occur due to friction, gravity, aircraft acceleration, induced forces, and/or inadvertent small pilot force inputs. The output of command deadzone 1004 is multiplied by vertical control sensitivity 1032 at multiplier 1006. This output is a command time rate of change of the vertical velocity.

This output is divided by the maximum value identified between ground speed 1026 and low speed threshold 1028 using divider 1008. Maximum value operator 1020 is to protect against a divide by zero in subsequent calculations. As a result, the larger of the value of ground speed 1026 and low speed threshold 1028 is used as the input to divider 1008 and multiplier 1012.

The output of divider 1008 is the commanded time rate of change of flight path angle and is sent into integrator 1019. This integration generates a commanded flight path angle as an output. This commanded flight path angle is then multiplied by the output of maximum value operator 1020 to generate a current vertical velocity command. This current vertical velocity command is multiplied by vertical damping derivative 1030. This output is then divided by vertical control sensitivity 1032 using divider 1016. The output of divider 1016 is then summed with vertical control sensitivity 1032 to generate flight path detent position 1022.

Figure 11:
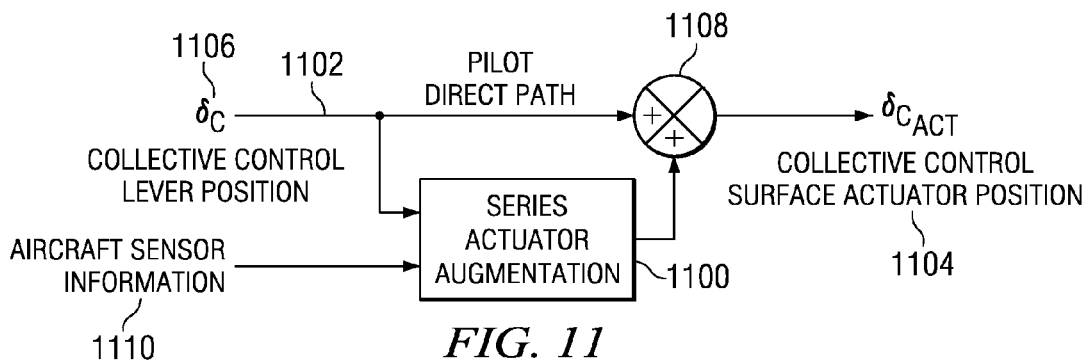
FIG. 11 is an illustration of a series actuator augmentation in accordance with an advantageous embodiment.

With reference now to FIG. 11, an illustration of a series actuator augmentation is depicted in accordance with an advantageous embodiment. In this example, series actuator augmentation 1100 may be used to act in series with pilot direct path 1102 to change collective control surface actuator position 1104. Pilot direct path 1102 is added to series actuator augmentation 1100 at summing node 1108. This path is a path through which collective control lever position 1106 may be received as an input as a result of an operator moving a collective control lever.

Series actuator augmentation 1100 may change collective control surface actuator position 1104 even though collective control lever position 1106 has not changed. Series actuator augmentation 1100 may generate changes based on aircraft sensor information 1110. As a result, the inputs, collective control lever position 1106 and aircraft sensor information 1110, may be used to generate collective control surface actuator position 1104.

Series actuator augmentation 1100 may be implemented using various actuators, such as limited authority stability augmentation system actuators. Further, this type of augmentation also may be applied to fly-by-wire systems. In a fly-by-wire system, both pilot direct path 1102 and series actuator augmentation 1100 may be implemented electronically as software components in a flight control computer. As an example, series actuator augmentation 1100 may be implemented as software and/or hardware and may be part of a flight control computer implemented using data processing system 500 in FIG. 5.

In this manner, series actuator augmentation 1100 may allow collective control lever position 1106 to move to a more advantageous position that provides wider separation between an altitude hold detent and a flight path angle detent without encountering undesirable overshoots of level flight.

Figure 12:
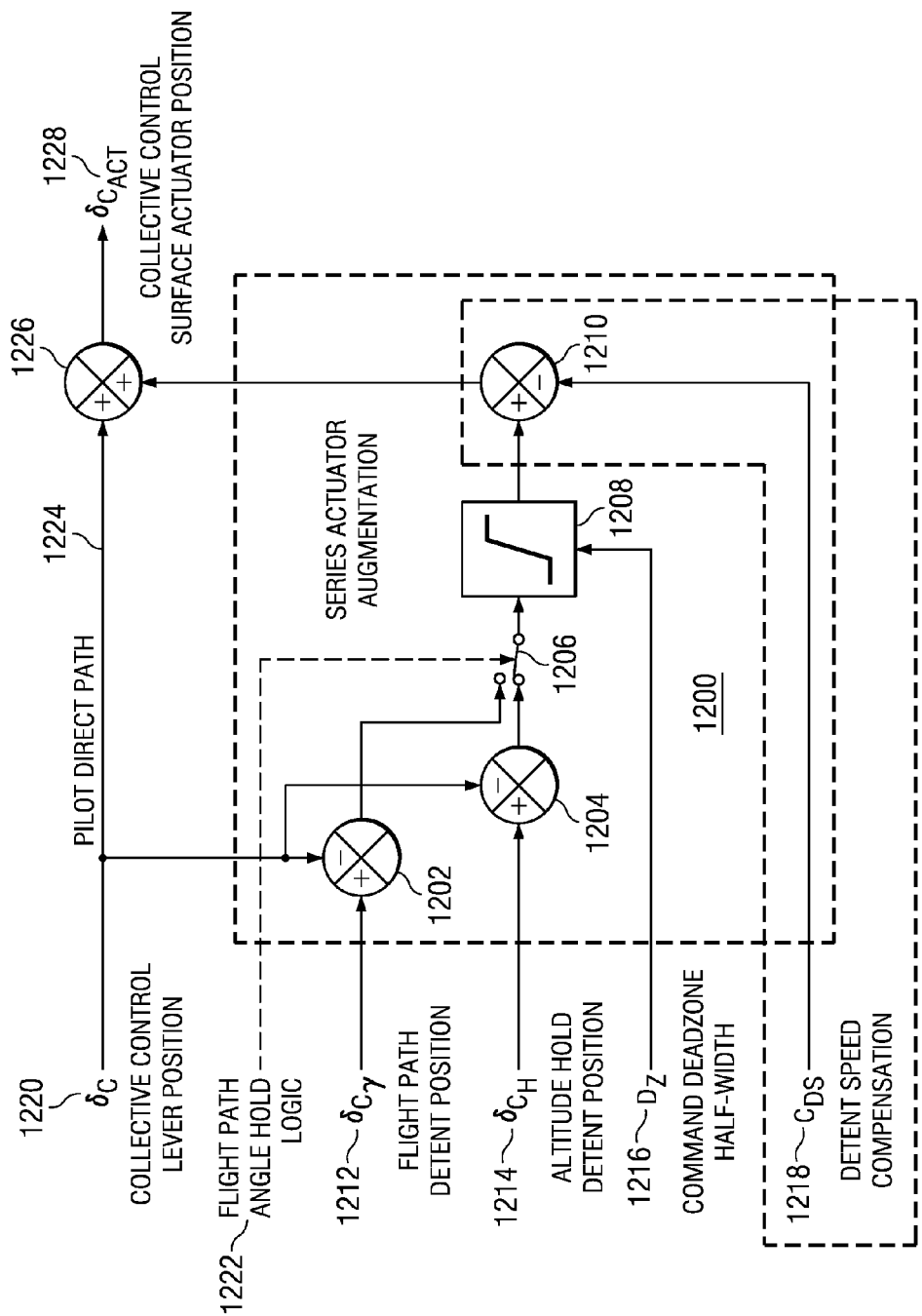
FIG. 12 is a diagram of a series actuator augmentation component in accordance with an advantageous embodiment.

With reference now to FIG. 12, a diagram of a series actuator augmentation component is depicted in accordance with an advantageous embodiment. In this example, series actuator augmentation 1200 is a more detailed illustration of series actuator augmentation 1100 in FIG. 11. Series actuator augmentation 1200 includes subtractor 1202, subtractor 1204, switch 1206, limiter 1208, and subtractor 1210.

In these examples, flight path detent position 1212, altitude hold detent position 1214, command deadzone half-width 1216, and detent spread compensation 1218 are examples of aircraft sensor information, such as aircraft sensor information 1110 in FIG. 11. In these illustrative examples, the command deadzone half-width is one half of the width of the entire command deadzone. For example, if a command deadzone is provided between collective control lever positions of 48 percent and 52 percent, the width of the deadzone would be 4 percent and the command deadzone half-width would be 2 percent. A command deadzone may be referred to as being +/− the command deadzone half-width. For example, +/−2 percent for a deadzone that extends between control positions of 48 percent and 52 percent.

Additionally, collective control lever position 1220 also may be input into series actuator augmentation 1200. Detent spread compensation 1218 may compensate for the fact that an altitude hold detent may be artificially positioned or spread to a cockpit control position that is farther away from a flight path angle hold detent than the natural stick position to hold the altitude. For example, when the pilot wants to return to a level flight condition from a commanded rate of descent, he can do so by moving the vertical controller upward until he feels contact with the altitude hold detent tactile cue.

The altitude hold detent cue indicates the point at which the pilot should stop moving the collective control lever so that the lever is positioned at the correct position to maintain level flight. When the altitude hold detent is artificially "spread" upward in a descending flight condition to increase the separation between the flight path and altitude hold detent positions, the pilot may stop moving the collective control lever at a position that is somewhat higher than the natural unaugmented stick position required to hold altitude.

As the system moves out of the flight path angle hold mode, the artificial spread in the altitude hold detent position is removed, thereby driving the altitude hold detent tactile cue and the collective control lever itself to the true position for level flight. Unfortunately, if detent spread compensation is not provided, initially positioning the collective control lever to a position above the true position for altitude hold will result in some level of transient overshoot of the target altitude.

In these illustrative examples, the purpose of the detent spread compensation is to cancel the impact of having the stick positioned above and outside the command detent when it is initially returned to the altitude hold tactile cue detent position from a descending flight condition. The detent spread compensation performs a similar function in reverse when the pilot commands a return to level flight from a climbing flight condition when detent spread augmentation is applied to widen the separation between the flight path angle and altitude hold detents. Another input into series actuator augmentation 1200 is flight path angle hold logic 1222.

In these examples, the modification to the command deadzone may be implemented through series actuator augmentation 1200. Flight path angle hold logic 1222 may determine when the deadzone may be implemented about flight path detent position 1212 or altitude hold detent position 1214. When flight path angle hold logic 1222 is true, indicating that the system is in the flight path hold mode, the command deadzone is provided to flight path detent position 1212. When flight path angle hold logic 1222 is false, indicating that the system is in altitude hold mode, the command deadzone is provided for altitude hold detent position 1214.

In these examples, detent spread compensation 1218 is introduced into the calculations performed by series actuator augmentation 1200. This value is subtracted from the output of limiter 1208 to generate a signal from which the detent spread compensation 1218 is subtracted using subtracter 1210. The input received from switch 1206 may be limited by limiter 1208. The limit, in these examples, is set by command deadzone half-width 1216.

This output is then added to the command generated by the pilot through pilot direct path 1224 using collective control lever position 1220 at summing node 1226. This output forms collective control surface actuator position 1228.

The output of subtracter 1210 cancels the effect of initially positioning the collective control lever above the unaugmented position for altitude hold when level flight is captured from an initial commanded descent. In this manner, the control surface is commanded to collective control surface actuator position 1228 to provide for level flight capture without a transient overshoot.

Figure 13:
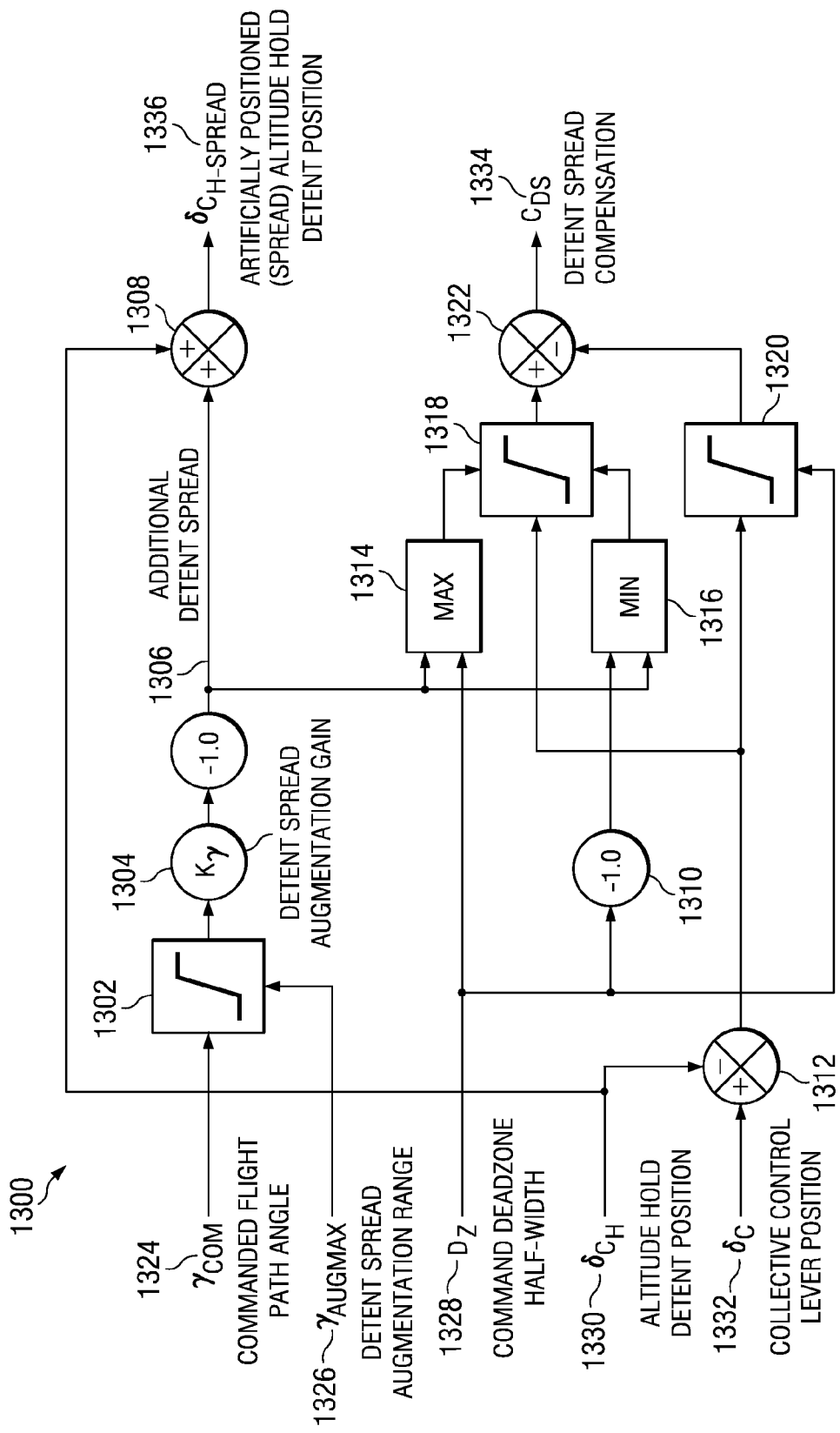
FIG. 13 is a block diagram that details the calculations used to compensate for detent spread augmentation in accordance with an advantageous embodiment.

With reference now to FIG. 13, an illustration in compensating for detent spread augmentation is depicted in accordance with an advantageous embodiment. In these examples, logic 1300 includes limiter 1302, detent spread augmentation gain 1304, sign inverter 1306, summing node 1308, inverter 1310, difference node 1312, maximum operator 1314, minimum operator 1316, limiter 1318, limiter 1320, and subtracter 1322.

The inputs into logic 1300 include commanded flight path angle 1324, detent spread augmentation range 1326, command deadzone half-width 1328, altitude hold detent position 1330, and collective control lever position 1332. The output generated by logic 1300 is detent spread compensation 1334 and artificially positioned spread altitude hold detent position 1336.

In the different advantageous embodiments, logic 1300 provides an ability to generate additional spread in the altitude hold detent position. In these examples, the calculation is based on commanded flight path angle 1324 in which limiter 1302 limits the angle to a relatively small range. This limiter is used because the augmented detent separation may be required only for small flight path angles. In these examples, a range of plus or minus two degrees of commanded flight path angle is a typical value for detent spread augmentation range 1326.

In these examples, limiter 1302 is a standard flight control element used by control system designers. With this component, if commanded flight path angle 1324 is greater than or equal to detent spread augmentation range 1326, then the output of limiter 1302 is set equal to detent spread augmentation range 1326. If commanded flight path angle 1324 is less than or equal to the value of the detent spread augmentation range 1326 multiplied by −1.0, then the output of limiter 1302 is set equal to the value of the detent spread augmentation range 1326 multiplied by −1.0. If commanded flight path angle 1324 is less than detent spread augmentation range 1326, and if commanded flight path angle 1324 is greater than the value of detent spread augmentation range 1326 multiplied by −1.0, then the output of limiter 1302 is set equal to commanded flight path angle 1324.

Detent spread augmentation gain 1304 defines the amount of detent spread per limited commanded flight path angle generated by limiter 1302. In these examples, this gain value may be, for example, one percent per degree. This output is then inverted using sign inverter 1306. A negative value is used because a negative descending commanded flight path angle generates a positive value for artificially positioned spread altitude hold detent position 1336.

In these examples, the additional detent spread generated by detent spread augmentation gain 1304 may be used to generate detent spread compensation 1334. The difference between collective control lever position 1332 and altitude hold detent position 1330 may be generated by difference node 1312. The output of difference node 1312 is sent into limiter 1320 and used to set the limit for collective control lever position 1332. The maximum allowable output of limiter 1318 may be set by maximum operator 1314. The minimum allowable output of limiter 1318 may be set by minimum operator 1316.

The output of maximum operator 1314 is equal to the larger of the additional detent spreads generated by detent spread augmentation gain 1304 through sign inverter 1306 and command deadzone half-width 1328. The output of minimum operator 1316 is equal to the lesser of the additional detent spreads generated by detent spread augmentation gain 1304 through sign inverter 1306 and command deadzone half-width 1328 with a negative value. The output of difference node 1312 also may be used as an input into limiter 1320. The output of limiter 1320 is limited to a range of plus or minus command deadzone half-width 1328 in these examples. Detent spread compensation 1334 is calculated as the difference between limiter 1318 and limiter 1320 using subtractor 1322.

Figure 14:
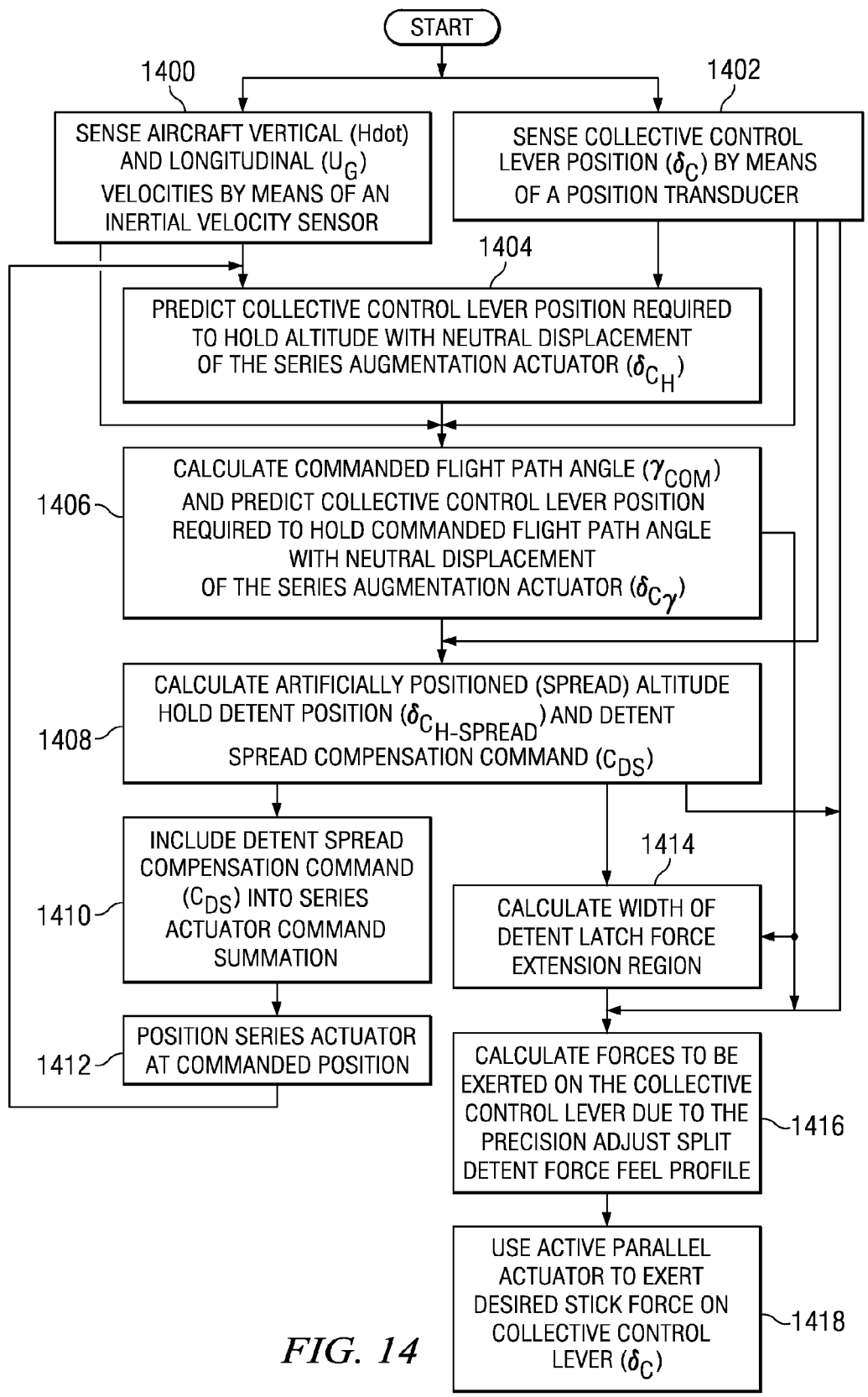
FIG. 14 is a flowchart of a process for generating a series actuator position and a force exerted on a collective lever in accordance with an advantageous embodiment.

With reference now to FIG. 14, a flowchart of a process for generating a series actuator position and a force exerted on a collective lever is depicted in accordance with an advantageous embodiment. In this example, the process is an example of a process that may be implemented in a data processing system, such as data processing system 500 in FIG. 5. Many of the different operations illustrated in FIG. 14 may operate concurrently even though the description of the different operations may be sequential.

In this example, aircraft vertical velocity (hdot) and the longitudinal velocity ($U_G$) are sensed by using an inertial velocity sensor (operation 1400). The collective control lever position ($\delta_C$) is sensed by using a position transducer (operation 1402).

The process predicts the collective control lever position required to hold altitude with neutral displacement of the series augmentation actuator ($\delta_{CH}$) based on vertical velocity (hdot), collective control lever position ($\delta_C$), and series actuator position (operation 1404).

Next, the commanded flight path angle ($\gamma_{COM}$) is calculated and the collective control lever position required to hold commanded flight path angle with neutral displacement of the series augmentation actuator (flight path detent position ($\delta_{C\gamma}$)) is predicted (operation 1406). The commanded flight path angle ($\gamma_{COM}$) 618 and the flight path detent position are calculated using the calculations described in logic 1000 in FIG. 10.

The process calculates the artificially positioned (spread) altitude hold detent position ($\delta_{CH\text{-}SPREAD}$) and the detent spread compensation command ($C_{DS}$) (operation 1408). These values may be calculated using logic 1300 in FIG. 13.

The process includes the detent spread compensation command ($C_{DS}$) in the summation of commands that are provided to the series actuator to generate a total series actuator command (operation 1410). The process then positions the series actuator at the commanded position (total series actuator command) (operation 1412). This operation may be implemented using actuator control loops. The output is the series actuator position, which may be used to set rotor collective blade pitch to the appropriate position.

Next, the process calculates the width of the detent latch force extension region based on artificially positioned (spread) altitude hold detent position ($\delta_{CH\text{-}SPREAD}$) and flight path detent position ($\delta_{C\gamma}$) (operation 1414). The process also calculates the desired stick force to be exerted on the collective control lever due to the precision adjust split detent force feel profile based on width of the detent latch force extension region, artificially positioned (spread) altitude hold detent position ($\delta_{CH\text{-}SPREAD}$), flight path detent position ($\delta_{C\gamma}$), and collective control lever position ($\delta_C$) (operation 1416). The process then controls the active parallel actuator to ensure that the force exerted on the collective control lever by the parallel actuator is equal to the desired stick force (operation 1418). The output generated by operation 1418 is the force exerted on the collective control lever. This force may be exerted using signals sent to a parallel actuator, such as parallel actuator 104 in FIG. 1.

Figure 15:
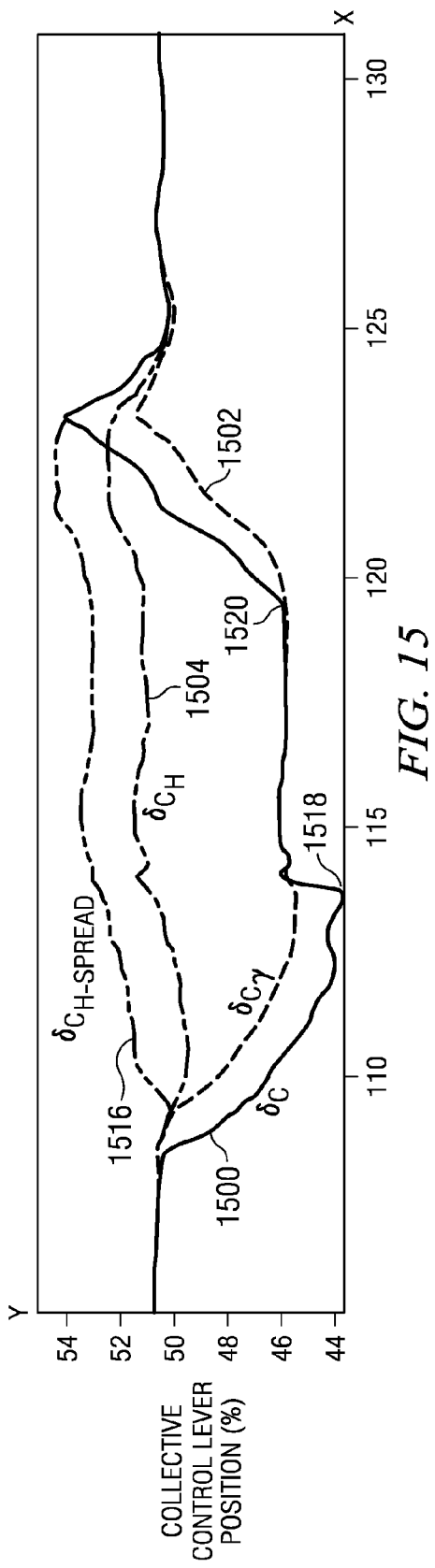
FIGS. 15-17 are diagrams illustrating a commanded descent and then a recapture of level flight from the initial commanded descent in accordance with an advantageous embodiment.
Figure 16:
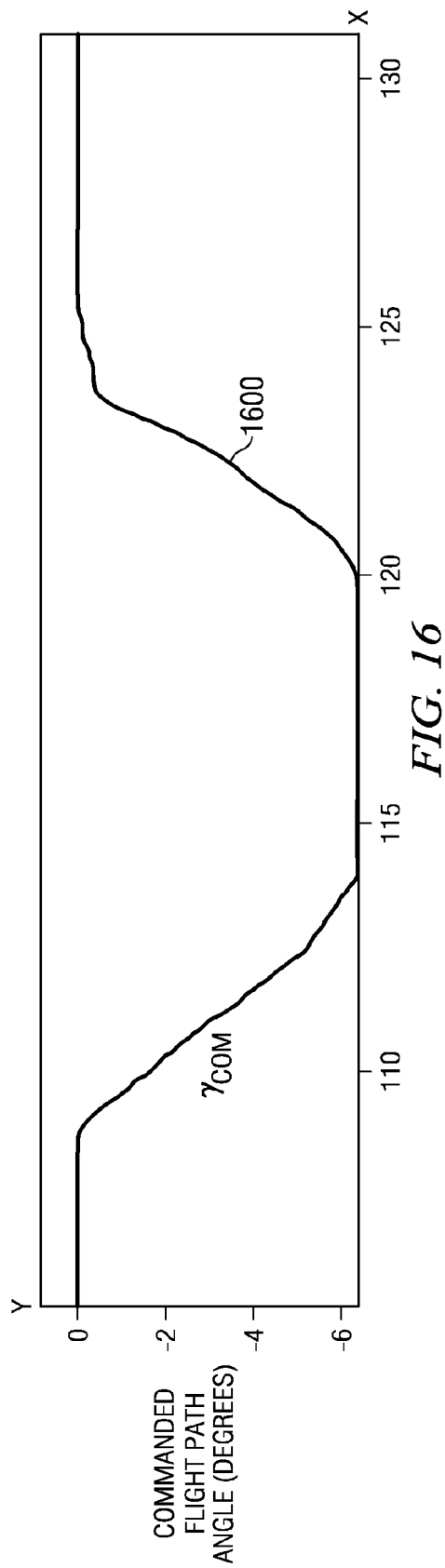
Figure 17:
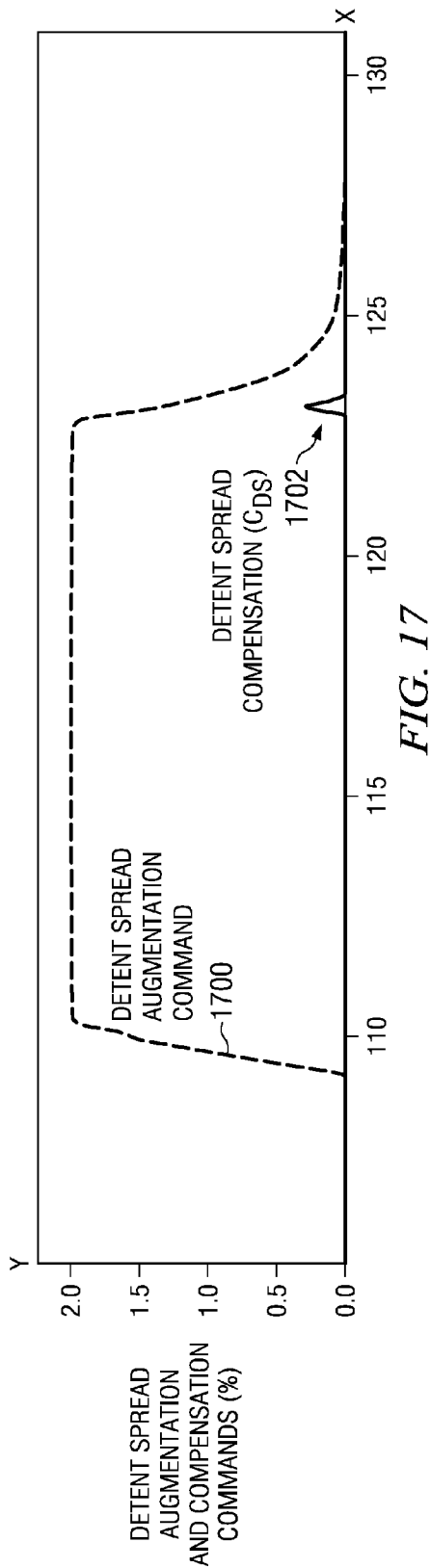

With reference now to FIGS. 15-17, diagrams illustrating commanded descent and recapture of level flight are depicted in accordance with an advantageous embodiment. In this example, trace 1500 represents collective control lever position, trace 1502 represents the flight path angle detent position, trace 1504 represents the un-augmented altitude hold detent position, and trace 1516 represents the augmented altitude hold detent position. The Y axis represents the collective control lever position and percentage. As the percentage increases, the collective control lever position moves upward. The X axis represents time in seconds in these examples.

In FIG. 16, trace 1600 represents the commanded flight path angle, in which the Y axis represents the units while the X axis represents time. In FIG. 17, trace 1700 represents the detent spread augmentation command, while trace 1702 represents the detent spread compensation. In this figure, the Y axis represents the percent of full travel while the X axis represents time.

In this example, a pilot may initiate a descent by exerting a downward force on the collective control lever and moving the collective control lever downward as illustrated in trace 1500. As trace 1500 decreases or moves downward, trace 1600 integrates downward in proportion to the difference between the collective control lever position in trace 1500 and the flight path angle detent position in trace 1502. As the commanded flight path angle in trace 1600 decreases from around 0.0 to around −2.0 degrees, the detent spread augmentation feature in the different advantageous embodiments spreads the augmented altitude hold detent position illustrated in trace 1516 to a maximum value of around 2.0 percent above the un-augmented altitude hold detent position as illustrated in trace 1504.

When the commanded rate of descent or flight path angle in trace 1600 is reached, around point 1518 in FIG. 15, the pilot may relax the stick force and allow the collective control lever to be pulled up into the flight path angle hold detent as illustrated in trace 1502. From this point, the commanded flight path angle illustrated in trace 1600 may be held by the system as long as the pilot does not apply a force that exceeds a breakout limit for the flight path hold detent.

When the pilot decides to recapture level flight at a time around point 1520 in FIG. 15, the pilot pulls the collective control lever upward as illustrated by trace 1500 at point 1520. This upward pull occurs until the pilot feels the artificially spread altitude hold detent tactile cue as shown in trace 1516. At that point, the pilot may relax the stick force.

The detent spread compensation command illustrated in trace 1702 in FIG. 17 compensates for the fact that the collective control lever position as illustrated in trace 1500 may momentarily be positioned above the actual steady state position required to hold the altitude as illustrated in trace 1504.

At an airspeed of around 45 knots true air speed (KTAS), a detent spread compensation command as illustrated in trace 1702 is around 0.3 percent of the collective control authority and is the amount of compensation needed to compensate for the detent augmentation spread that is momentarily present during level flight capture in trace 1700. Larger detent spread compensation commands may be required at lower airspeeds and smaller detent spread compensation commands may be required for higher airspeeds.

Figure 18:
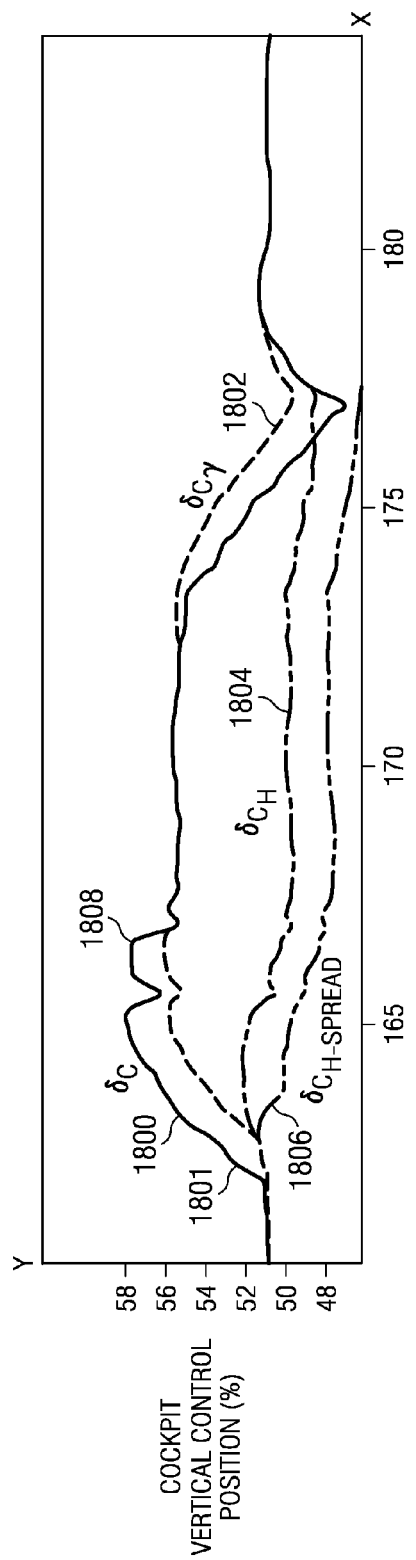
FIGS. 18-20 are diagrams illustrating a commanded climb and then a recapture of level flight from the initial commanded climb in accordance with an advantageous embodiment.
Figure 19:
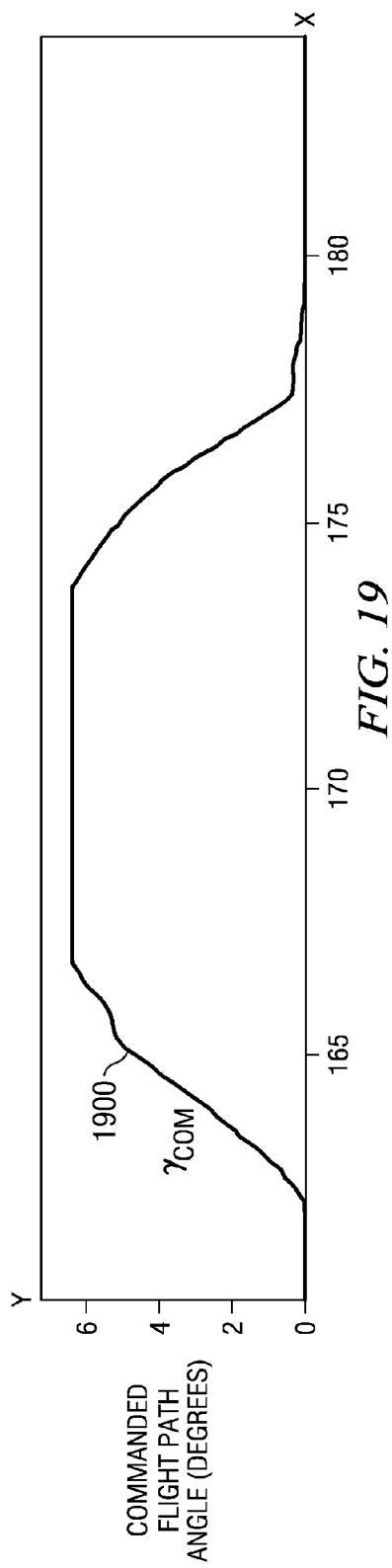
Figure 20:
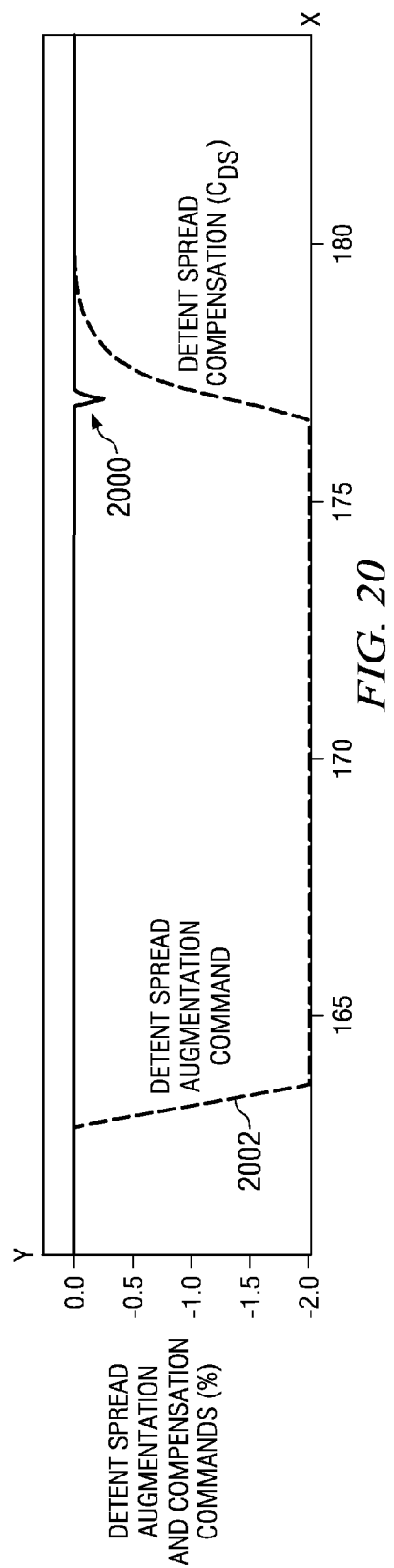

With reference now to FIGS. 18-20, diagrams illustrating commanded climb and recapture of level flight are depicted in accordance with an advantageous embodiment. In this example, an illustration of detent augmentation spread and detent spread compensation are depicted for a commanded climb and recapture of level flight. In this example, collective control lever position is depicted in trace 1800, flight path angle detent position is depicted in trace 1802, un-augmented altitude hold detent position is illustrated in trace 1804, and augmented altitude hold detent position is illustrated in trace 1806. In this example, the Y axis represents the collective control lever position in terms of percent of full travel upwards. The X axis represents time.

In FIG. 19, trace 1900 represents the commanded flight path angle. In this figure, the Y axis represents degrees, while the X axis represents time. In FIG. 20, trace 2000 represents the detent spread compensation command, while trace 2002 represents the detent augmentation command. In these examples, the Y axis represents the percent of travel or position of the collective control lever while the X axis represents time.

As depicted, a pilot may initiate a climb by exerting an upward force on the collective control lever and moving the collective control lever upward as illustrated in trace 1800 at around point 1801. The commanded flight path angle integrates upward in proportion to the difference between the collective control lever position in trace 1800 and the flight path angle detent position in trace 1802. This commanded flight path angle is illustrated in trace 1900. As the commanded flight path angle in trace 1900 increases from around 0.0 degrees to around 2.0 degrees, the detent spread augmentation feature in the advantageous embodiments spreads the augmented altitude hold detent position in trace 1806 to a minimum value of around −2.0 percent below the un-augmented altitude hold detent position in trace 1804.

When the desired commanded flight path angle, flight path angle 1900, is reached at a time around point 1808 in FIG. 18, the pilot, in this example, relaxes the stick force and allows the collective control lever in trace 1800 to be pulled down into flight path angle hold detent 1802. From this point, the command of flight path angle illustrated in trace 1900 may be held by the system as long as the pilot does not apply a stick force that exceeds the breakout limit of the flight path hold detent.

When the pilot decides to recapture level flight around 174 seconds, the pilot may push the collective control lever down until the pilot feels the artificially spread altitude hold detent tactile cue illustrated in trace 1806. The pilot may then relax the stick force. The detent spread compensation command illustrated in trace 2000 occurs at a time of around 177 seconds.

This command compensates for the fact that the collective control lever is momentarily positioned slightly below the actual steady state collective control lever position required to hold the altitude as illustrated in trace 1800. The un-augmented altitude hold detent position is illustrated in trace 1804.

An airspeed of around 45 KTAS may only require a detent spread compensation command that is around 0.3 percent equivalent of the collective control authority to compensate for the detent spread augmentation in trace 2002 that occurs momentarily during level flight capture. Larger detent spread compensation commands may be required at lower airspeeds and smaller detent spread compensation commands may be required at higher airspeeds.

Figure 21:
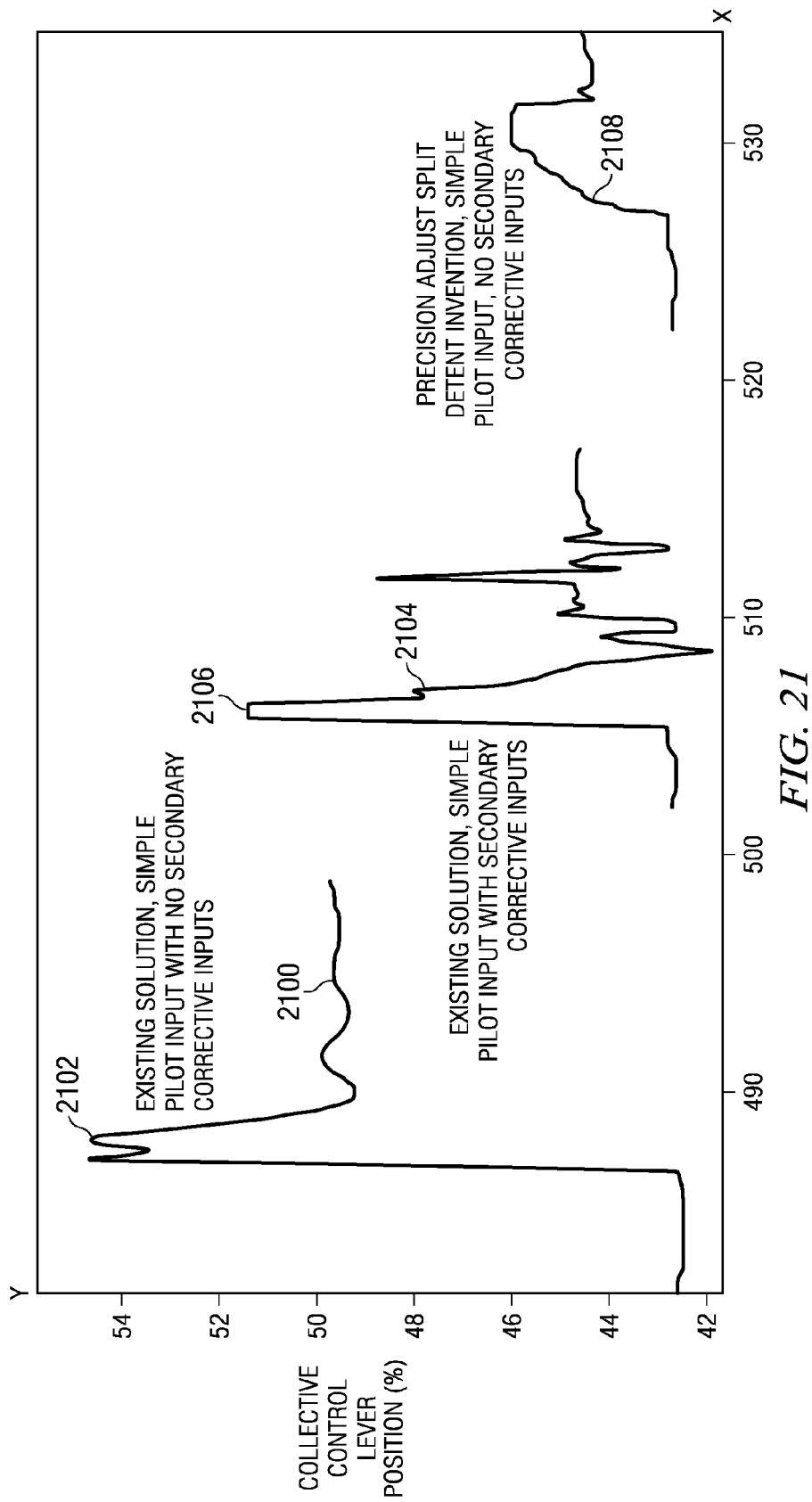
FIGS. 21 and 22 are illustrations of time histories comparing the ability of the pilot to command a precise reduction in rate of descent in accordance with an advantageous embodiment with the inability of the pilot to command a precise reduction in rate of descent using current systems.
Figure 22:
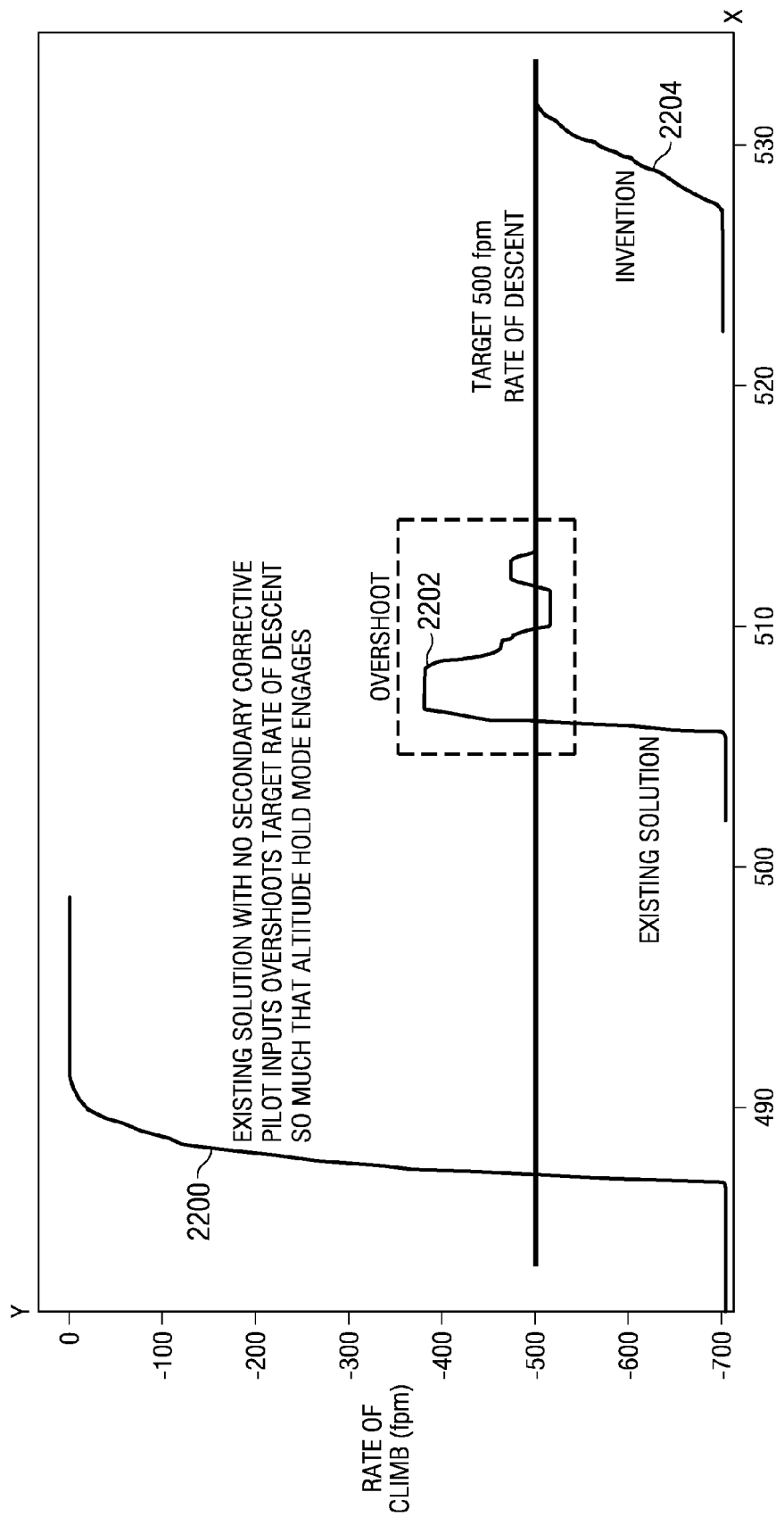

With reference now to FIGS. 21 and 22, diagrams comparing ability to reduce rate of descent are depicted in accordance with an advantageous embodiment. In this example, in FIG. 21, the Y axis represents collective control lever position, while the X axis represents time. In FIG. 22, the Y axis represents the rate of climb, while the X axis represents time.

Trace 2100 and trace 2200 represent traces for an example wherein a pilot attempts to make a small collective control lever input to reduce the flight path angle using existing force feel profiles. In this example, trace 2200 illustrates that a much larger change in vertical rate occurs than may be desired. These two traces illustrate the results when no corrective pilot inputs are made. If the pilot does not make secondary corrective inputs to compensate for the stick jumping, as illustrated around point 2102, the system will actually transition into an altitude hold mode because the stick moves far enough to reach the altitude hold detent position in this example.

In trace 2104, the pilot makes secondary corrective inputs. Trace 2202 illustrates the rate of climb corresponding to these inputs. As can be seen, an overshoot of the target 500 fpm rate of descent occurs as illustrated in trace 2202. This overshoot may occur for several seconds as the result of the initial stick jump as illustrated around point 2106.

With reference now to trace 2108 and trace 2204, with the different advantageous embodiments, the pilot can make a simple collective control lever input without encountering any overshoot of the desired rate of climb. As can be seen in trace 2204 a reduction in the rate of descent occurs without overshoot. This type of result occurs from implementation of one or more of the different advantageous embodiments. These embodiments include a detent latch force extension as illustrated in force feel profile 700 in FIG. 7.

Figure 23:
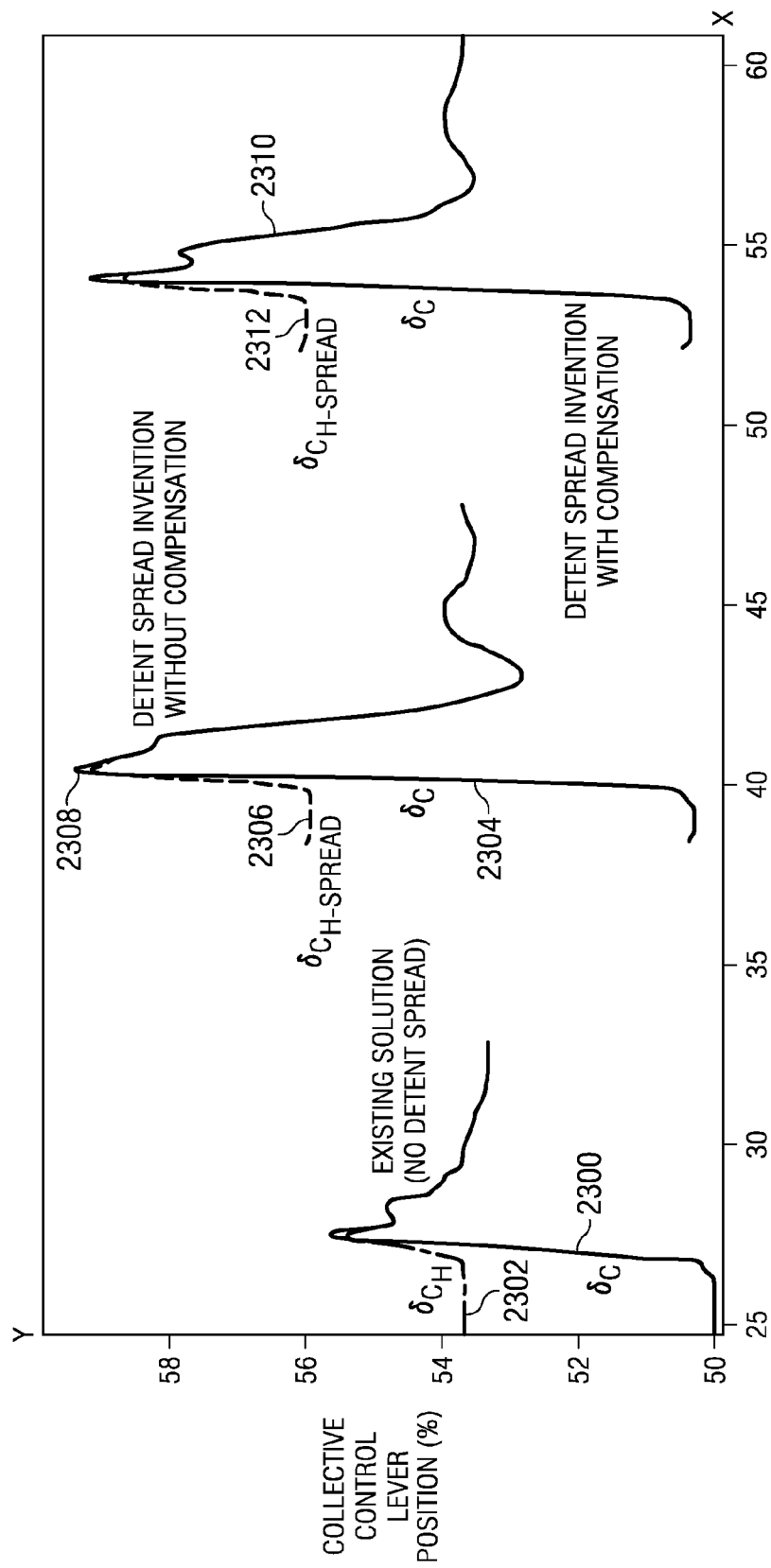
FIGS. 23 and 24 are time histories illustrating the advantages of compensating for the detent spread augmentation feature in accordance with an advantageous embodiment.
Figure 24:
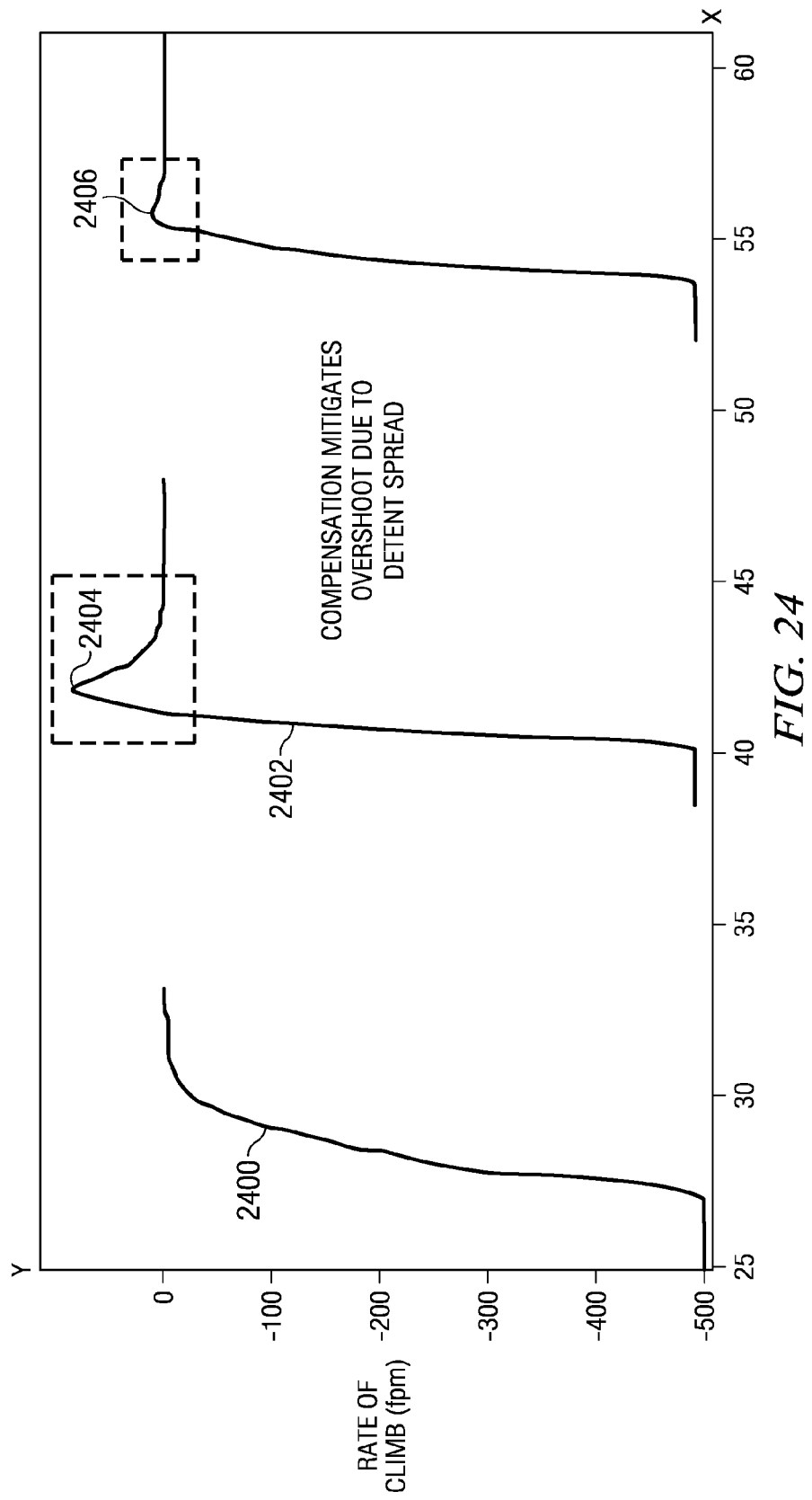

With reference now to FIGS. 23 and 24, diagrams illustrating advantages of detent spread augmentation are depicted in accordance with an advantageous embodiment. In FIG. 23, the Y axis represents the collective control lever position as a percentage of the "fully up" position while the X axis represents time. In FIG. 24, the Y axis represents a rate of climb, while the X axis represents time.

Trace 2300 in FIG. 23 represents the vertical controller position, trace 2400 represents the rate of climb for a level flight capture from around an initial 500 feet per minute commanded rate of descent. In this example, the pilot may move the vertical controller upwards until the altitude hold detent tactile cue is reached in trace 2302. The collective controller position in trace 2300 follows the altitude hold detent as shown in trace 2302 and makes adjustments necessary to capture level flight with no vertical overshoots. In this example, no detent spread is present.

The collective control lever position in trace 2304 and the artificially spread altitude hold detent position demonstrated in trace 2306 illustrate that if detent spread augmentation is introduced without compensation, positioning the altitude hold detent tactile cue above the true altitude hold position gives rise to an overshoot of the desired zero rate of climb flight condition as illustrated by the change in collective control lever position at point 2308 in trace 2304. The corresponding overshoot in rate of climb is illustrated in trace 2402 at around point 2404. By adding series actuator compensation for the detent spread augmentation, the same types of movements with respect to collective control lever position illustrated in trace 2310 and artificially spread altitude hold detent position illustrated in trace 2312 result in minimal rate of climb overshoot as illustrated in trace 2406.

This example illustrates the results when a series actuator is controlled to compensate for detent spread augmentation to eliminate overshoot of the desired flight condition. In this manner, this detent spread compensation reduces the overshoot of the desired flight condition.

Thus, the different advantageous embodiments provide a method and apparatus for providing tactile cues to an inceptor. In these examples, split detents are present. The two detents may be for different states of operating the aircraft, such as maintaining a constant velocity or a constant altitude.

The different advantageous embodiments provide an ability to generate a profile in which movement from one set of characteristics for one state to another set of characteristics for another state may occur without an unintended movement of the inceptor. These types of characteristics are especially useful for lower flight speeds at which smaller movements of the inceptor may result in larger changes in the performance of the aircraft.

Further, the different advantageous embodiments also provide a capability to reduce overlapping of characteristics between two different detents. This avoids tactile cues that may be confusing or unexpected. Further, unintended changes in modes that may occur due to overlapping of characteristics for different detents also may be avoided.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples such as modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Although the illustrative examples are described with reference to an aircraft, such as, a helicopter, other advantageous embodiments may be applied to other vehicles. For example, the different advantageous embodiments may be applied to, for example, without limitation, vertical take off and landing aircraft, fixed wing aircraft, spacecraft, submarines, and other suitable vehicles.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A split detent tactile cueing control system comprising:
an inceptor configured for being moved into a plurality of positions, wherein the inceptor is located in a vehicle;
a position sensor coupled to the inceptor, wherein the position sensor is located in the vehicle and is capable of generating a position signal;
a set of vehicle sensors configured for generating a set of signals in response to detecting a set of parameters about the vehicle during a flight; and
a flight control computer coupled to the inceptor and the set of vehicle sensors, wherein the flight control computer is configured for generating a first set of actuation signals used to generate tactile cues to generate a flight path hold detent and an altitude hold detent within the plurality of positions using a force feel profile and the set of parameters, wherein an extension of a constant latch force from the flight path hold detent to the altitude hold detent is present during velocity changes in a direction of the vehicle.

2. The split detent tactile cueing control system of claim 1, wherein the flight control computer is configured for generating a second set of actuation signals used to generate tactile cues to prevent overlapping between a flight path hold detent profile and an altitude hold detent profile when flight path angles in a range of approximately 1.5 to approximately 4.5 degrees are commanded.

3. The split detent tactile cueing control system of claim 2, wherein the flight control computer is configured for generating the second set of actuation signals to prevent the overlapping between the flight path hold detent profile and the altitude hold detent profile and series actuator inputs to prevent over shooting an altitude hold state.

4. The split detent tactile cueing control system of claim 1, wherein the first set of actuation signals is sent to a parallel actuator coupling the flight control computer to the inceptor.

5. The split detent tactile cueing control system of claim 2, wherein the second set of actuation signals is sent to a parallel actuator coupling the flight control computer to the inceptor.

6. The split detent tactile cueing control system of claim 1, wherein the split detent tactile cueing control system is located in a helicopter.

7. The split detent tactile cueing control system of claim 1, wherein the inceptor is a collective control lever.

8. The split detent tactile cueing control system of claim 1, wherein the set of vehicle sensors comprises an inertial velocity sensor.

9. An apparatus comprising:
an inceptor; and
a flight control computer configured for providing tactile cues to the inceptor, wherein the flight control computer is configured for generating a first detent profile and a second detent profile to generate the tactile cues for the inceptor in response to a set of parameters detected during flight, wherein the first detent profile includes an extension of a constant latch force towards the second detent profile.

10. The apparatus of claim 9, wherein the extension of the first detent profile towards the second detent profile minimizes unintended movements of the inceptor.

11. The apparatus of claim 9, wherein the flight control computer is configured for increasing a distance between a first detent in the first detent profile and a second detent in the second detent profile to minimize interference between tactile cues for the first detent profile and the second detent profile in the inceptor.

12. The apparatus of claim 9, wherein the flight control computer is configured for increasing a separation between a first detent in the first detent profile and a second detent in the second detent profile to minimize uncommanded transitions between different flight modes.

13. The apparatus of claim 12, wherein the different flight modes comprise a flight path hold mode and an altitude hold mode.

14. The apparatus of claim 9 further comprising:
a helicopter, wherein the inceptor and the flight control computer are located within the helicopter.

15. A method for providing tactile cues for an inceptor in a vehicle, the method comprising:
generating a first detent profile and a second detent profile for a plurality of positions of the inceptor; and
extending a constant latch force from the first detent profile towards the second detent profile, wherein changes in a position of the inceptor between a first detent in the first detent profile and a second detent in the second detent profile occur, wherein unintended repositioning of the inceptor is reduced.

16. The method of claim 15, wherein the extending step comprises:
maintaining a constant level of restoring force on the inceptor when the inceptor is moved out of a velocity detent position and moved toward an altitude hold detent position.

17. The method of claim 15 further comprising:
increasing a distance between the first detent in the first detent profile and the second detent in the second detent profile to minimize interference between the tactile cues for the first detent profile and the second detent profile in the inceptor.

18. The method of claim 15 further comprising:
increasing the distance between the first detent in the first detent profile and the second detent in the second detent profile to minimize uncommanded transitions between a flight path hold mode and an altitude hold mode.

19. The method of claim 15, wherein the first detent profile is for a flight path hold state and the second detent profile is for an altitude hold state.

20. The method of claim 15, wherein the vehicle is a helicopter.

* * * * *